US009401945B2

(12) United States Patent
Kato et al.

(10) Patent No.: US 9,401,945 B2
(45) Date of Patent: Jul. 26, 2016

(54) APPARATUS, SYSTEM, AND METHOD OF MANAGING DATA TRANSMISSION, AND RECORDING MEDIUM STORING DATA TRANSMISSION MANAGEMENT PROGRAM

(75) Inventors: Yoshinaga Kato, Kanagawa (JP); Takahiro Asai, Kanagawa (JP); Masayuki Ishigami, Gunma (JP)

(73) Assignee: Ricoh Company, Ltd., Tokyo (JP)

( * ) Notice: Subject to any disclaimer, the term of this patent is extended or adjusted under 35 U.S.C. 154(b) by 515 days.

(21) Appl. No.: 13/570,480

(22) Filed: Aug. 9, 2012

(65) Prior Publication Data

US 2013/0060926 A1 Mar. 7, 2013

(30) Foreign Application Priority Data

Sep. 1, 2011 (JP) .................................. 2011-190602

(51) Int. Cl.
*G06F 15/16* (2006.01)
*H04L 29/06* (2006.01)
*H04N 21/422* (2011.01)
*H04N 21/4223* (2011.01)
*H04N 21/4788* (2011.01)
*H04N 21/488* (2011.01)

(52) U.S. Cl.
CPC .............. *H04L 65/80* (2013.01); *H04L 65/605* (2013.01); *H04N 21/4223* (2013.01); *H04N 21/42203* (2013.01); *H04N 21/4788* (2013.01); *H04N 21/4882* (2013.01); *H04L 65/403* (2013.01)

(58) Field of Classification Search
CPC .................................................... H04L 65/605
USPC ................................ 709/223, 229; 348/14.12
See application file for complete search history.

(56) References Cited

U.S. PATENT DOCUMENTS

| | | |
|---|---|---|
| 2005/0232151 A1 | 10/2005 | Chapweske et al. |
| 2006/0132607 A1 | 6/2006 | Kimber et al. |
| 2011/0252265 A1* | 10/2011 | Iwami et al. ................... 713/401 |
| 2011/0314099 A1* | 12/2011 | Imai et al. ...................... 709/204 |
| 2012/0056975 A1* | 3/2012 | Yamashita et al. .......... 348/14.13 |
| 2012/0140021 A1 | 6/2012 | Tanaka et al. |
| 2012/0140022 A1 | 6/2012 | Kato et al. |
| 2012/0147140 A1* | 6/2012 | Itakura et al. .................... 348/43 |

FOREIGN PATENT DOCUMENTS

| | | |
|---|---|---|
| JP | 9-186981 | 7/1997 |
| JP | 2008-131412 | 6/2008 |
| JP | 2010-239393 | 10/2010 |

OTHER PUBLICATIONS

Extended Search Report issued Feb. 14, 2013 in European Application No. 12181469.3.
Office Action mailed Jun. 2, 2015, in Japanese Patent Application No. 2011-190602.

* cited by examiner

*Primary Examiner* — David Lazaro
*Assistant Examiner* — Marie Georges Henry
(74) *Attorney, Agent, or Firm* — Oblon, McClelland, Maier & Neustadt, L.L.P.

(57) ABSTRACT

An apparatus, system, method, and program stored in a non-transitory recording medium, each of which generates a message indicating that image data is not received or only sound data is received, when a relay device transmits only the sound data from a transmission terminal to a counterpart transmission terminal, and transmits the message to the counterpart transmission terminal for display to a user at the counterpart transmission terminal.

12 Claims, 23 Drawing Sheets

FIG. 10

IMAGE STATE CHANGE MANAGEMENT TABLE

| TERMINAL IP ADDRESS | IMAGE STATE |
|---|---|
| 1.2.1.2 | HIGH |
| 1.2.2.2 | LOW |
| 1.3.1.2 | INTERRUPT |
| 1.3.2.2 | MEDIUM |

FIG. 11

RELAY TERMINAL MANAGEMENT TABLE

| RELAY TERMINAL ID | OPERATION STATE | DATE AND TIME RECEIVED | RELAY TERMINAL IP ADDRESS | MAXIMUM DATA TRANSMISSION SPEED (Mbps) |
|---|---|---|---|---|
| 111a | ON LINE | 2009.11.10.13:00 | 1.2.1.2 | 100 |
| 111b | ON LINE | 2009.11.10.13:10 | 1.2.2.2 | 1000 |
| 111c | OFF LINE | 2009.11.10.13:20 | 1.3.1.2 | 100 |
| 111d | ON LINE | 2009.11.10.13:30 | 1.3.2.2 | 10 |

FIG. 12

TERMINAL AUTHENTICATION MANAGEMENT TABLE

| TERMINAL ID | PASSWORD |
|---|---|
| 01aa | aaaa |
| 01ab | abab |
| 01ba | baba |
| ... | ... |

FIG. 13

TERMINAL MANAGEMENT TABLE

| TERMINAL ID | TERMINAL NAME | OPERATION STATE | DATE AND TIME RECEIVED | TERMINAL IP ADDRESS |
|---|---|---|---|---|
| 01aa | JAPAN TOKYO OFFICE AA TERMINAL | ONLINE (COMMUNICATION OK) | 2009.11.10.13:40 | 1.2.1.3 |
| 01ab | JAPAN TOKYO OFFICE AB TERMINAL | OFFLINE | 2009.11.09.12:00 | 1.2.1.4 |
| ... | ... | ... | ... | ... |
| 01ba | JAPAN OSAKA OFFICE BA TERMINAL | ONLINE (COMMUNICATION OK) | 2009.11.10.13:45 | 1.2.2.3 |
| 01bb | JAPAN OSAKA OFFICE BB TERMINAL | ONLINE (INTERRUPT) | 2009.11.10.13:50 | 1.2.2.4 |
| ... | ... | ... | ... | ... |
| 01ca | U.S. NY OFFICE CA TERMINAL | OFFLINE | 2009.11.10.12:45 | 1.3.1.3 |
| 01cb | U.S. NY OFFICE CB TERMINAL | ONLINE (COMMUNICATING) | 2009.11.10.13:55 | 1.3.1.4 |
| ... | ... | ... | ... | ... |
| 01da | U.S. WASH, D.C. OFFICE DA TERMINAL | ONLINE (COMMUNICATING) | 2009.11.08.12:45 | 1.3.2.3 |
| 01db | U.S. WASH, D.C. OFFICE DB TERMINAL | ONLINE (COMMUNICATION OK) | 2009.11.10.12:45 | 1.3.2.4 |
| ... | ... | ... | ... | ... |

FIG. 14

CANDIDATE LIST MANAGEMENT TABLE

| REQUEST TERMINAL ID | COUNTERPART TERMINAL ID |
|---|---|
| 01aa | 01ab,···,01ba,01bb,···,01ca,01cb,01da,01db,··· |
| 01ab | 01aa,01ca,01cb |
| 01ba | 01aa,01ab,01ca,01cb,01da,01db |
| ··· | ··· |
| 01db | 01aa,01ab,01ba,···,01da,01ca,01cb,···,01da |

FIG. 15

SESSION MANAGEMENT TABLE

| SESSION ID | RELAY TERMINAL ID | REQUEST TERMINAL ID | COUNTERPART TERMINAL ID | DELAY TIME (ms) | DATE AND TIME RECEIVED |
|---|---|---|---|---|---|
| se1 | 111a | 01aa | 01db | 200 | 2009.11.10.14:00 |
| se2 | 111b | 01ba | 01ca | 50 | 2009.11.10.14:10 |
| se3 | 111d | 01bb | 01da | 400 | 2009.11.10.14:20 |
| ··· | ··· | ··· | ··· | ··· | ··· |

FIG. 16

ADDRESS PRIORITY MANAGEMENT TABLE

| DOT ADDRESS SIMILARITY | ADDRESS PRIORITY POINT |
| --- | --- |
| S. S. S. D | 5 |
| S. S. D. - | 3 |
| S. D. -. - | 1 |
| D. -. -. - | 0 |

FIG. 17

TRANSMISSION SPEED PRIORITY MANAGEMENT TABLE

| MAXIMUM DATA TRANSMISSION SPEED (Mbps) | TRANSMISSION SPEED PRIORITY POINT |
| --- | --- |
| 1000 ~ | 5 |
| 100 ~ 1000 | 3 |
| 10 ~ 100 | 1 |
| ~ 10 | 0 |

FIG. 18

IMAGE STATE MANAGEMENT TABLE

| DELAY TIME (ms) | IMAGE STATE |
| --- | --- |
| 0 ~ 100 | HIGH |
| 100 ~ 300 | MEDIUM |
| 300 ~ 500 | LOW |
| 500 ~ | INTERRUPT |

FIG. 23

| RELAY TERMINAL ID | ADDRESS PRIORITY POINT | | TRANSMISSION SPEED PRIORITY POINT | TOTAL PRIORITY POINT |
| --- | --- | --- | --- | --- |
| | FIRST ADDRESS PRIORITY POINT FOR REQUEST | SECOND ADDRESS PRIORITY POINT FOR COUNTERPART TERMINAL | | |
| 111a | 5 | 1 | 3 | 8 |
| 111b | 3 | 1 | 5 | 8 |
| 111c | - | - | - | - |
| 111d | 1 | 5 | 1 | 6 |

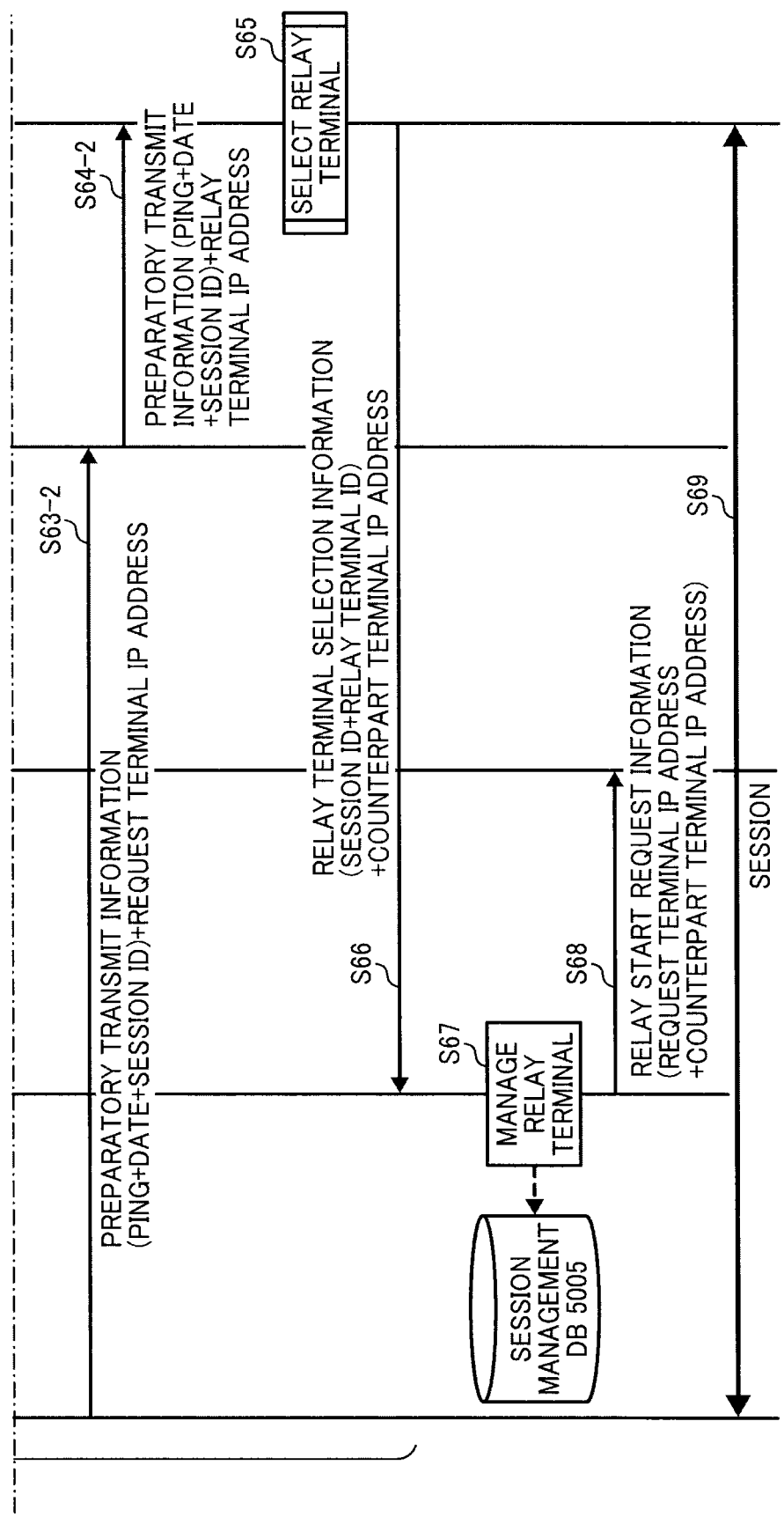

APPARATUS, SYSTEM, AND METHOD OF MANAGING DATA TRANSMISSION, AND RECORDING MEDIUM STORING DATA TRANSMISSION MANAGEMENT PROGRAM

CROSS-REFERENCE TO RELATED APPLICATIONS

This patent application is based on and claims priority pursuant to 35 U.S.C. §119 to Japanese Patent Application No. 2011-190602, filed on Sep. 1, 2011, in the Japan Patent Office, the entire disclosure of which is hereby incorporated herein by reference.

BACKGROUND

1. Field

The present invention generally relates to managing transmission of data, and more specifically to managing transmission of contents data through a relay device between or among a plurality of transmission terminals.

2. Background

The transmission systems allow transmission of contents data such as image data and/or sound data among a plurality of transmission terminals that are remotely located from one another through a relay device to facilitate communication among the plurality of transmission terminals through a communication network such as the Internet. With the need for reducing costs or times associated with business trips, more companies are moving towards transmission systems provided with the above-described teleconference or videoconference capabilities.

Even in case there is a trouble in communication network or processing capabilities of the transmission terminal, the transmission systems may still transmit image data using the coding technique such as the H.264/Scalable Video Coding (SVC) as described in Japanese Patent Application Publication No. 2010-506461. However, there may be some cases in which image data cannot be transmitted even with the above-described coding technique, for example, when the transmission capability of the communication network is greatly lowered. In such case, only sound data may be transmitted from the transmission terminal to the counterpart transmission terminal to at least carry out teleconference.

SUMMARY

In case of transmitting only the sound data, a user at the counterpart transmission terminal is not able to see an image of the user at the transmission terminal. Without the image of the user at the other site, the user at the counterpart transmission terminal that receives only the sound data is not able to determine whether the user still participates in conference if the sound data is not received, or whether there is any failure in the transmission system. Accordingly, the user may feel uncomfortable in talking to the user at the transmission terminal at the other site, when the user only hears the voice of the user from the other site.

In view of the above, one aspect of the present invention is to provide an apparatus, system, and method of managing transmission of contents data, and a data transmission management program stored in a recording medium, each of which is capable of generating a message indicating that image data is not received or only sound data is received in case the relay device transmits only the sound data to the counterpart transmission terminal, and causing the counterpart transmission terminal to display such message to the user.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 10 is an example data structure of an image state change management table, managed by the relay terminal of FIG. 7;

FIG. 11 is an example data structure of a relay terminal management table, managed by the management system of FIG. 7;

FIG. 12 is an example data structure of a terminal authentication management table, managed by the management system of FIG. 7;

FIG. 13 is an example data structure of a terminal management table, managed by the management system of FIG. 7;

FIG. 14 is an example data structure of a candidate list management table, managed by the management system of FIG. 7;

FIG. 15 is an example data structure of a session management table, managed by the management system of FIG. 7;

FIG. 16 is an example data structure of an address priority management table, managed by the management system of FIG. 7;

FIG. 17 is an example data structure of a transmission speed priority management table, managed by the management system of FIG. 7;

FIG. 18 is an example data structure of an image state management table, managed by the management system of FIG. 7;

FIG. 23 is a table storing priority points of the relay terminals that are respectively calculated by the transmission management system of FIG. 7 during the operation of limiting a number of candidate relay terminals;

FIGS. 24A and 24B are a data sequence diagram illustrating operation of selecting a relay terminal, performed by the transmission system of FIG. 1, according to an example embodiment of the present invention;

Figure 1:
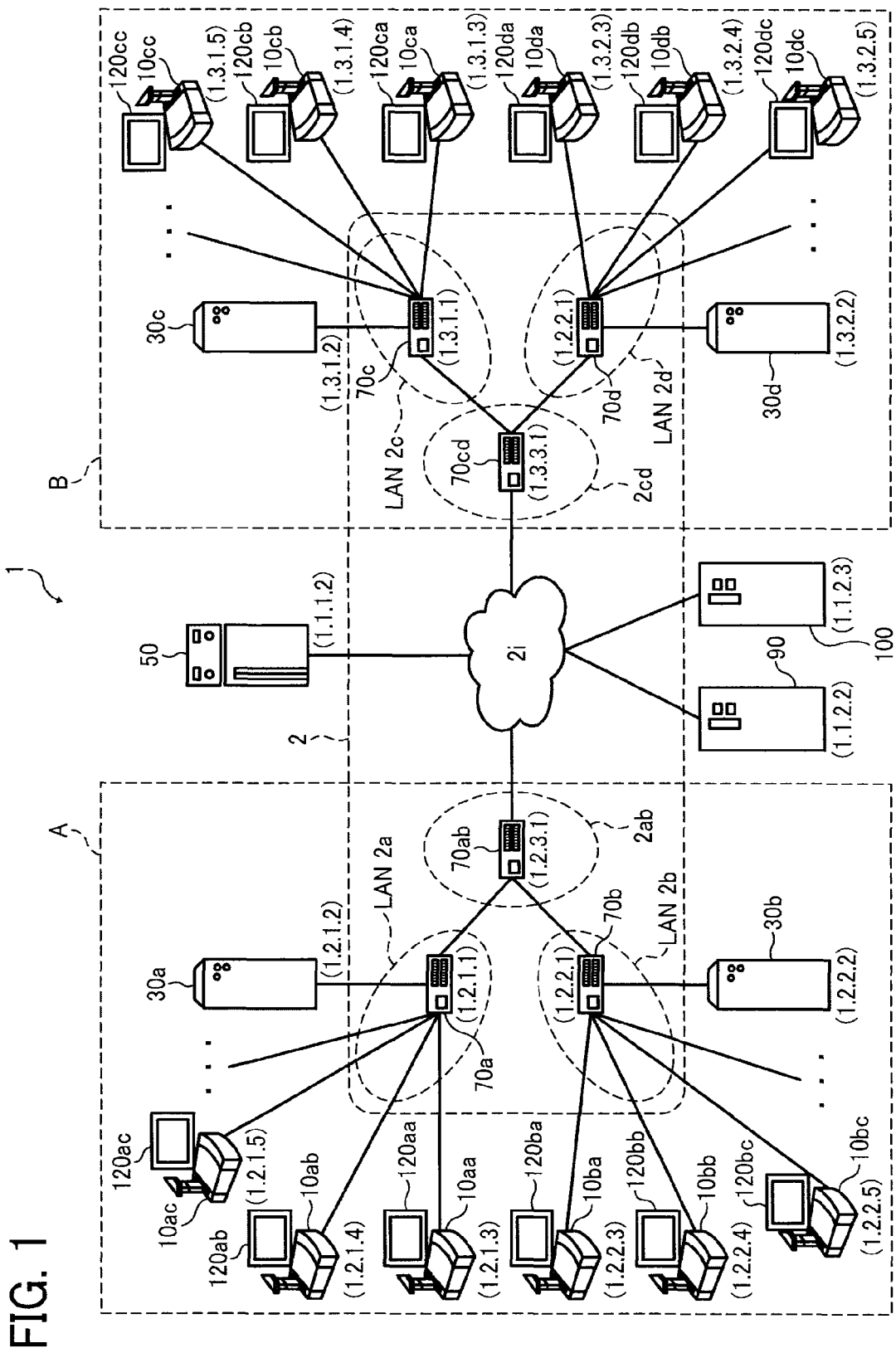
FIG. 1 is a schematic block diagram illustrating a configuration of a transmission system, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

<Structure of Transmission System>

Figure 2:
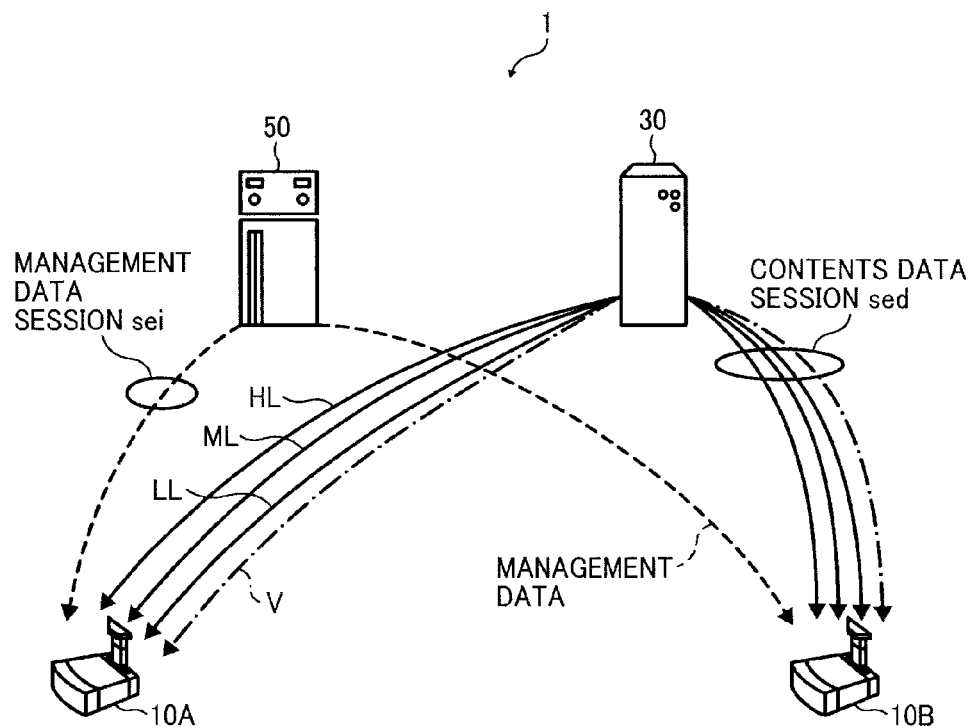
FIG. 2 is an illustration for explaining transmission or reception of data such as image data, sound data, or management data, performed by the transmission system of FIG. 1.
Figure 3A:
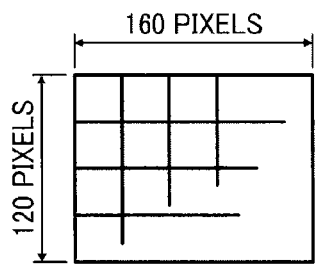
FIGS. 3A to 3C are illustrations for explaining image quality of image data transmitted or received by the transmission system of FIG. 1.
Figure 3B:
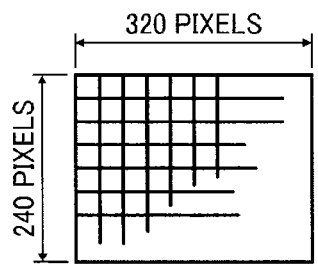
Figure 3C:
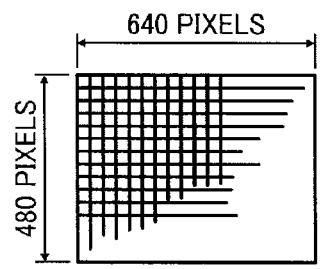

FIG. 1 is a schematic block diagram illustrating a transmission system, according to an example embodiment of the present invention. FIG. 2 is an illustration for explaining transmission or reception of data such as image data, sound data, or management data, performed by the transmission system of FIG. 1. FIGS. 3A to 3C are illustrations for explaining image quality of image data transmitted or received by the transmission system of FIG. 1.

In one example, the transmission system 1 functions as a data providing system that transmits contents data from one transmission terminal to another transmission terminal in one direction through a transmission management system 50. In another example, the transmission system 1 functions as a two-way communication system that exchanges various information including image data and/or sound data that is used to convey human's feelings between or among two or more of a plurality of transmission terminals 10 each of which functioning as a communication terminal, through the transmission management system 50 that functions as a communication management system. When functioning as the communication system, the transmission system 1 may be implemented as a videoconference system, video teleconference system, voice conference system, voice teleconference system, or personal computer screen sharing system.

In the following examples, it is assumed that the transmission system 1 of FIG. 1 is implemented as the videoconference system, which is one example structure of the communication system. Based on this assumption, the transmission management system 50 is implemented as the videoconference communication management system, which is one example structure of the communication management system. Further, the transmission terminal 10 is implemented as the videoconference communication terminal, which is one example structure of the communication terminal. However, the use of transmission system 1 is not limited to the following examples such that the transmission system 1 may be implemented as the transmission system or the communication system as described above.

The transmission system 1 of FIG. 1 includes a plurality of transmission terminal 10*aa*, 10*ab*, 10*ac*, 10*ba*, 10*bb*, 10*bc*, 10*ca*, 10*cb*, 10*cd*, 10*da*, 10*db*, and 10*dc*, and a plurality of displays 120*aa*, 120*ab*, 120*ac*, 120*ba*, 120*bb*, 120*bc*, 120*ca*, 120*cb*, 120*cc*, 120*da*, 120*db*, and 120*dc*, a plurality of relay terminals 30*a*, 30*b*, 30*c*, and 30*d*, a transmission management system 50, a program providing system 90, and a maintenance system 100.

The transmission terminal 10 transmits or receives contents data such as image data and/or sound data to or from another transmission terminal 10.

For the descriptive purposes, in this example, any number of the plurality of terminals 10*aa* to 10*dc* may be collectively or each referred to as the terminal 10. Any number of the plurality of displays 120*aa* to 120*dc* may be collectively or each referred to as the display 120. Any number of the plurality of relay terminals 30*a*, 30*b*, 30*c*, and 30*d* may be collectively or each referred to as the relay terminal 30. The transmission management system 50 may be referred to as the "management system" 50.

The terminal 10 that transmits data to another terminal 10 to carry out videoconference is referred to as the request terminal 10A. The terminal 10 that receives data from another terminal 10 to carry out videoconference is referred to as the counterpart terminal 10B. For example, the request terminal 10A includes any terminal 10 that requests another terminal 10 to start videoconference, and the counterpart terminal 10B includes any terminal 10 that is requested by the request terminal 10A to start videoconference.

As illustrated in FIG. 2, in the transmission system 1, the request terminal 10A and the counterpart terminal 10B first establish a management data session sei to start transmission and reception of various types of management data through the management system 50. Further, in this example, the request terminal 10A and the counterpart terminal 10B establish four contents data sessions sed to transmit or receive contents data through the relay terminal 30. The four contents data sessions include a session "HL" to transmit high-level resolution image data HL, a session "ML" to transmit medium-level resolution image data ML, a session "LL" to transmit low-level resolution image data LL, and a session "V" to transmit sound data V such as voice data V. In this example, these four contents data sessions may be referred to as image and/or sound data sessions.

Referring now to FIGS. 3A to 3C, various image data having different resolution levels, which are respectively transmitted by the terminal 10 of the transmission system 1, are explained. Referring to FIG. 3A, the low-level resolution image data, which functions as a base image, has 160 pixels in the horizontal direction and 120 pixels in the vertical direction. Referring to FIG. 3B, the medium-level resolution image data has 320 pixels in the horizontal direction and 240 pixels in the vertical direction. Referring to FIG. 3C, the high-level resolution image data has 640 pixels in the horizontal direction and 480 pixels in the vertical direction. In case of communicating with a narrowband signal line, low-quality image data that is generated based on the low-level resolution image data, which is the base image, is transmitted. In case of communicating with a wideband signal line, medium-quality image data that is generated based on the low-level resolution image data and the medium-level resolution image data is transmitted. In case of communicating with a broadband signal line, high-quality image data that is generated based on the low-level resolution image data, the medium-level resolution image data, and the high-level resolution image data is transmitted. Any one of the above-described types of image data may be transmitted together with sound data such as voice data.

Referring back to FIG. 1, the relay terminal 30 relays contents data such as image data or sound data between or among the terminals 10. For example, the relay terminal 30, which may be alternatively referred to as the relay device, may be implemented by a router or any device that provides the function of router. The management system 50 centrally manages various information such as login information of the terminal 10, the operation state of the terminal 10, candidate list information, and the operation state of the relay terminal 30. In this example, it is assumed that a moving image is transmitted as the image data. Alternatively, a still image, or both of the still image and the moving image, may be transmitted as the image data.

The plurality of routers 70a to 70d, 70ab, and 70cd, which may be collectively or each referred to as the router 70, selects a route that is most suitable for transmitting contents data such as image data and sound data.

The program providing system 90 includes a hard disk device (HD) 204 (FIG. 6), which stores a terminal control program that causes the terminal 10 to perform various functions or operations. For example, the program providing system 90 sends the terminal control program to the terminal 10 through the Internet 2i to cause the terminal 10 to install the terminal control program. Further, the HD 204 of the program providing system 90 may store a relay control program that causes the relay terminal 30 to perform various functions or operations. For example, the program providing system 90 sends the relay control program to the relay terminal 30 through the Internet 2i to cause the relay terminal 30 to install the relay control program. Further, the HD 204 of the program providing system 90 may store a transmission management program that causes the management system 50 to perform various functions or operations. For example, the program providing system 90 sends the transmission management program to the management system 50 to cause the management system 50 to install the transmission management program.

The maintenance system 100 is implemented as a computer capable of maintaining, managing, fixing, or upgrading at least one of the terminal 10, relay terminal 30, management system 50, and program providing system 90. Assuming that the maintenance system 100 is provided within a country, and the terminal 10, relay terminal 30, management system 50, and program providing system 90 are each installed outside the country, the maintenance system 100 maintains, manages, fixes, or upgrades at least one of the terminal 10, relay terminal 30, management system 30, and program providing system 90, remotely through the communication network 2. The maintenance system 100 may manage maintenance of at least one of the terminal 10, relay terminal 30, management system 50, and program providing system 90 without using the communication network 2. For example, a machine type number, a manufacturing number, customer information, maintenance and repair information, and failure log information may be maintained at the maintenance system 100 without using the communication network 2.

Still referring to FIG. 1, the terminals 10aa, 10ab, and 10ac, the relay terminal 30a, and the router 70a are connected to a local area network (LAN) 2a. The terminals 10ba, 10bb, and 10bc, the relay terminal 30b, and the router 70b are connected to a LAN 2b. The LAN 2a and the LAN 2b are connected to a leased line 2ab in which the router 70ab is provided. It is assumed that these devices including the terminals 10aa to 10bc are located in an area A. For example, assuming that the area is any area in Japan, the LAN 2a could be located within an office in a city such as Tokyo, and the LAN 2b could be located within an office in another city such as Osaka.

The terminals 10ca, 10cb, and 10cc, the relay terminal 30c, and the router 70c are connected to a LAN 2c. The terminals 10da, 10db, and 10dc, the relay terminal 30d, and the router 70d are connected to a LAN 2d. The LAN 2c and the LAN 2d are connected to a leased line 2cd in which the router 70cd is provided. It is assumed that these devices including the terminals 10ca to 10dc are located in an area B apart from the area A. For example, assuming that the area is any area in the United States, the LAN 2c could be located within an office in a city such as New York, and the LAN 2d could be located within an office in another city such as Washington, D.C. The area A and the area B are connected through the Internet 2i, via the routers 70ab and 70cd.

The management system 50 and the program providing system 90 are connected through the Internet 2i to the terminal 10 and the relay terminal 30. Any one of the management system 50 and the program providing system 90 may be located at any location within or outside any one of the area A and the area B.

In this example, the communication network 2 includes the LAN 2a, LAN 2b, leased line 2ab, Internet 2i, leased line 2cd, LAN 2c, and LAN 2d. Any one or any portion of these lines or any other lines that may be included in the communication network 2 may be implemented as wired network or wireless network such as Wireless Fidelity (WiFi) network or Bluetooth network.

As shown in FIG. 1, the terminal 10, the relay terminal 30, the management system 50, the router 70, and the program providing system 90 are each provided with four digit numbers. These four digit numbers separated by dots are the simple expressions of IP addresses respectively assigned to any one of the devices shown in FIG. 1, each of which has a function of communication device. For example, the IP address of the terminal 10aa is "1.2.1.3". For simplicity, it is assumed that the IP address is expressed in IPv4. Alternatively, the IP address may be expressed in IPv6.

Further, in this example, the terminal 10 may be communicated in various ways. For example, at least two different terminals 10 that are located at different rooms in the same office, or at least two different terminals 10 that are located at different offices that are remotely located from one another, may communicate with one another. In another example, at least two different terminals 10 that are located in the same room may communicate with one another. In another example, one terminal 10 that is located indoor and another terminal 10 that is located outdoor, or at least two different terminals 10 that are both located outdoor, may communicate with one another. When the terminal 10 is located outdoor, the terminal 10 communicates with the other terminal 10 through a wireless network such as a wireless network designed for a mobile phone.

<Hardware Structure of Transmission System>

Figure 4:
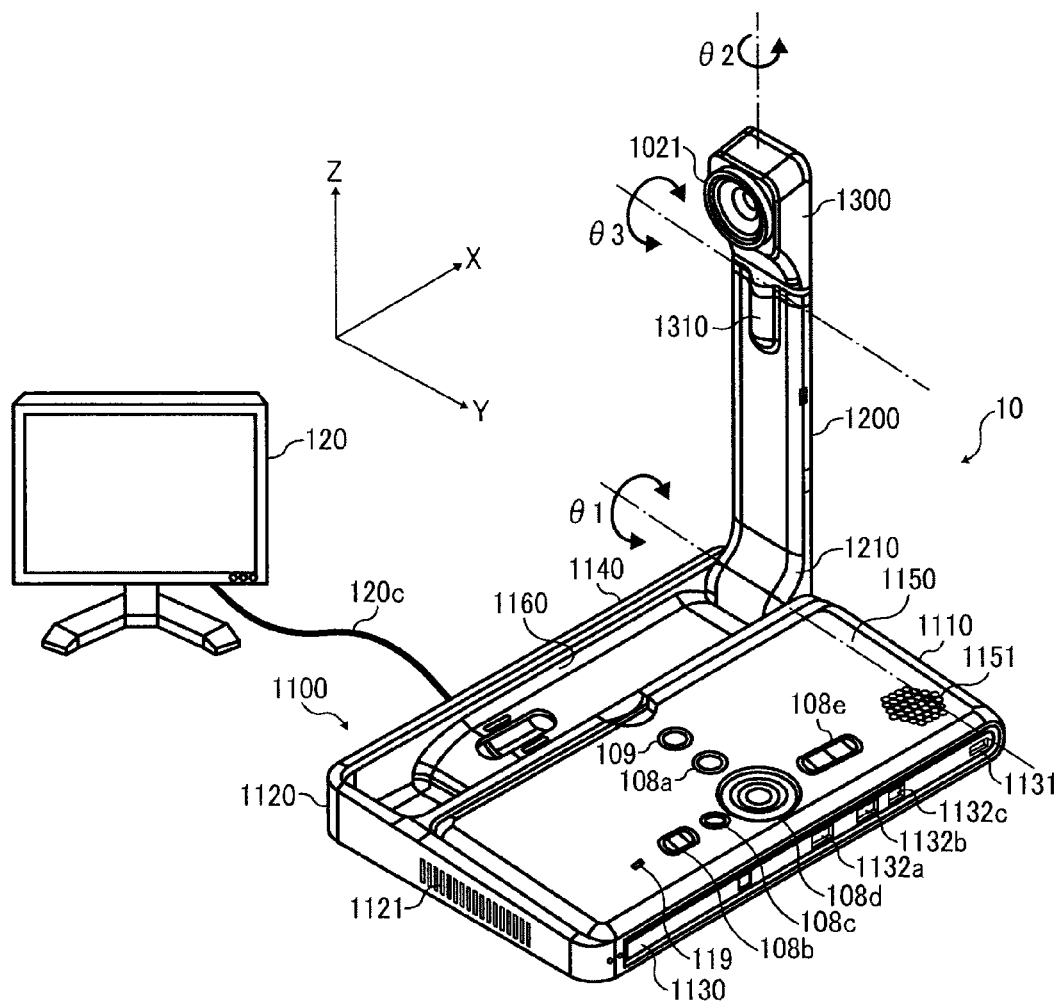
FIG. 4 is a perspective view illustrating the outer appearance of a transmission terminal of the transmission system of FIG. 1.

FIG. 4 is a perspective view illustrating the outer appearance of the transmission terminal 10 of the transmission system of FIG. 1. In FIG. 4, the longitudinal direction of the terminal 10 is referred to as x direction. The direction orthogonal to the x direction, which is the horizontal direction of the terminal 10, is referred to as the y direction. The direction orthogonal to the x direction and the y direction is referred to as the z direction.

As illustrated in FIG. 4, the terminal 10 includes a body 1100, an arm 1200, and a camera housing 1300. The body 1100 includes a back side wall 1110 having a plurality of air intake holes that are formed over the nearly entire surface of the intake surface of the back side wall 1110. The body 1100 further includes a front side wall 1120 provided with an exhaust surface 1121 having a plurality of exhaust holes over the nearly entire surface of the exhaust surface 1121. When a cooling fan that is provided within the body 1100 is driven, air flows in through the intake holes of the intake surface and out through the exhaust holes of the exhaust surface 1121. The body 1100 further includes a right side wall 1130 formed with a sound pickup hole 1131. Through the sound pickup hole 1131, a microphone 114 (FIG. 5) of the terminal 10 is able to catch sounds such as human voice or any sound including noise.

Figure 5:
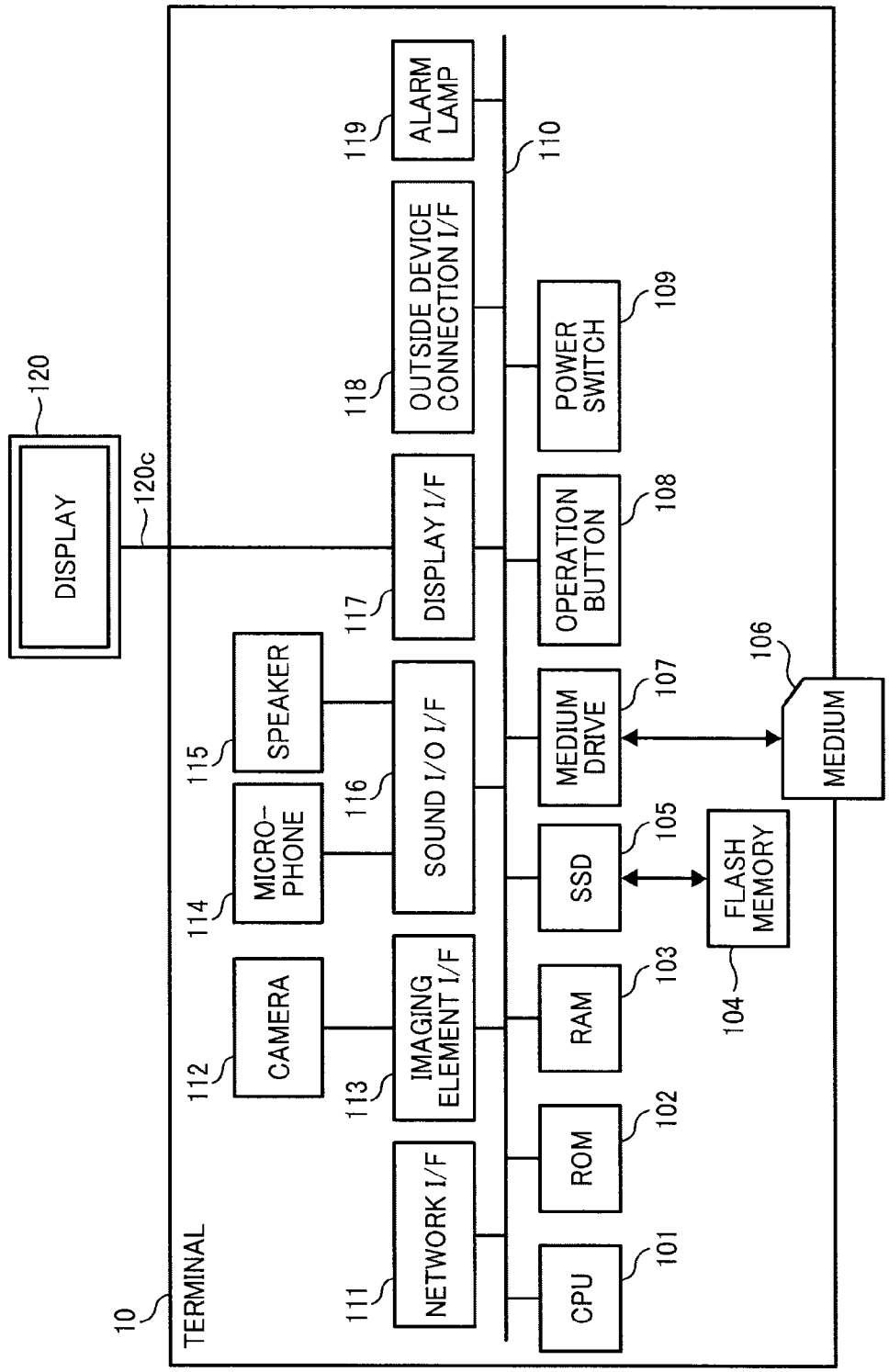
FIG. 5 is a schematic block diagram illustrating a hardware structure of the transmission terminal of FIG. 1.

The body 1100 has an operation panel 1150, which is provided at a front surface toward the right side wall 1130. The operation panel 1150 includes a plurality of operation buttons 108a to 108e ("the operation button 108"), a power switch 109, an alarm lamp 119, and a plurality of sound output holes 1151. Through the sound output holes 1151, a speaker 115 (FIG. 5) of the terminal 10 is able to output sounds such as sounds generated based on human voice. The body 1100 further includes a holder 1160, which is provided at the front surface toward the left side wall 1140. The holder 1160, which has a concave shape, accommodates therein the arm 1200 and the camera housing 1300. The right side wall 1130 is further provided with a plurality of connection ports 1132a to 1132c ("connection ports 1132"). The connection ports 1132 allow electrical connection to an external device through an outside device connection I/F 118 (FIG. 5). The body 1100 further includes a left side wall 1140, which is provided with a connection port to connect the external display 120 to the display I/F 117 through a cable 120c.

The arm 1200 is fixed to the body 1100 via a torque hinge 1210. With the torque hinge 1210, the arm 1200 can be rotated in directions of up and down with respect to the body, while making a tilt angle $\theta 1$ of up to 135 degrees. FIG. 4 illustrates the case where the tilt angle $\theta 1$ is 90 degrees.

The camera housing 1300 incorporates therein the camera 112 (FIG. 5) that takes an image of an object. The object may be a part of a user, document, or a room where the terminal 10 is located. The camera housing 1300 is provided with a torque hinge 1310. The camera housing 1300 is fixed to the arm 1200 through the torque hinge 1310. With the torque hinge 1310, the camera housing 1300 can be rotated with respect to the arm 1200, in the direction of up, down, right, and left, such that the camera housing 1300 is kept at a desired position. More specifically, the camera housing 1300 can be rotated, while making a pan angle $\theta 2$ from about −180 degrees to 180 degrees in the direction right and left, and a tilt angle $\theta 3$ that ranges from about −45 degrees to +45 degrees in the direction of up and down. In FIG. 4, the pan angle $\theta 2$ and the tilt angle $\theta 3$ are each 0 degree.

The relay terminal 30, the management system 50, the program providing system 90, and the maintenance system 100 are each implemented by a general-purpose computer such as a personal computer or a server computer. For simplicity, explanation of the outer appearance of the computer is omitted.

FIG. 5 is a schematic block diagram illustrating a hardware structure of the transmission terminal 10. As illustrated in FIG. 5, the terminal 10 includes a central processing unit (CPU) 101, a read only memory (ROM) 102, a random access memory (RAM) 103, a flash memory 104, a solid state drive (SSD) 105, a medium drive 107, the operation button 108, the power switch 109, a network interface (I/F) 111, the camera 112, an imaging element interface (I/F) 113, the microphone 114, the speaker 115, a sound input/output interface (I/O I/F) 116, the display interface (I/F) 117, the outside device connection interface (I/F) 118, and an alarm lamp 119, which are electrically connected through a bus 110 such as an address bus or data bus. The CPU 101 controls entire operation of the terminal 10. The ROM 102 stores therein a control program for execution by the CPU 101, such as an initial program loader (IPL). The RAM 103 functions as a work area of the CPU 101. The flash memory 104 stores therein various data such as the terminal control program, image data, or sound data such as voice data. The SSD 105 controls reading or writing of various data with respect to the flash memory 104 under control of the CPU 101. The medium drive 107 controls reading or writing of various data with respect to a removable recording medium 106 such as a flash memory. The operation button 108 allows the user to input a user instruction, for example, by allowing the user to select a communication destination such as the counterpart terminal 10B. The power switch 109 allows the user to switch on or off the power of the terminal 10. The network I/F 111 allows the terminal 10 to transmit data through the communication network 2.

The camera 112 takes an image of an object to obtain image data under control of the CPU 101. The imaging element I/F 113 controls operation of the camera 112. The microphone 114 catches sounds such as voice of the user at the terminal 10. The speaker 115 outputs sounds such as sounds generated based on voice of the user at the counterpart terminal 10B. The sound I/O I/F 116 controls input or output of sound signals such as voice signals with respect to the microphone 114 and the speaker 115 under control of the CPU 101. The display I/F 117 transmits image data to the display 120 under control of the CPU 101. The outside device connection I/F 118 controls connection of the terminal 10 to various types of outside device. The alarm lamp 119 generates notification when an error is detected in the terminal 10.

The display 120 may be implemented by a liquid crystal display (LCD) or an organic light emitting display, which displays various data such as an image of an object or an operation icon. As illustrated in FIGS. 4 and 5, the display 120 is connected to the display I/F 117 through the cable 120c. The cable 120c may be implemented by an analog RCB (VGA) signal cable, a component video cable, a high-definition multimedia interface (HDMI) signal cable, or a digital video interactive (DVI) signal cable.

The camera 112 includes a plurality of devices such as a lens system, and a solid-state image sensing device that photo-electrically converts a light to generate an image of an object. For example, the solid-state image sensing device includes a complementary metal oxide semiconductor (CMOS) or a charge coupled device (CCD).

The outside device connection I/F 118 may be connected to an outside device such as an external camera, external microphone, or external speaker through a universal serial bus (USB) cable that is connected through the port 1132 of the body 1100 (FIG. 4). When the external camera is connected to the terminal 10, the CPU 101 causes the terminal 10 to capture an image using the external camera, rather than the camera 112 that is incorporated in the terminal 10. When the external microphone or the external speaker is connected to the terminal 10, the CPU 101 causes the terminal 10 to use the external microphone or the external speaker in replace of the incorporated microphone 114 or the incorporated speaker 115.

The recording medium 106, which can be freely attached to or detached from the terminal 10, includes any desired type of recording medium. In alternative to the flash memory 104, any nonvolatile memory that is readable and writable under control of the CUP 101 may be used such as Electrically Erasable and Programmable ROM (EEPROM).

The terminal control program may be written onto a recording medium that is readable by a general-purpose computer such as the recording medium 106 in any format that is installable or executable by a general-purpose computer. Once the terminal control program is written onto the recording medium, the recording medium may be distributed. Further, the terminal control program may be stored in any desired memory other than the flash memory 104, such as the ROM 102.

Figure 6:
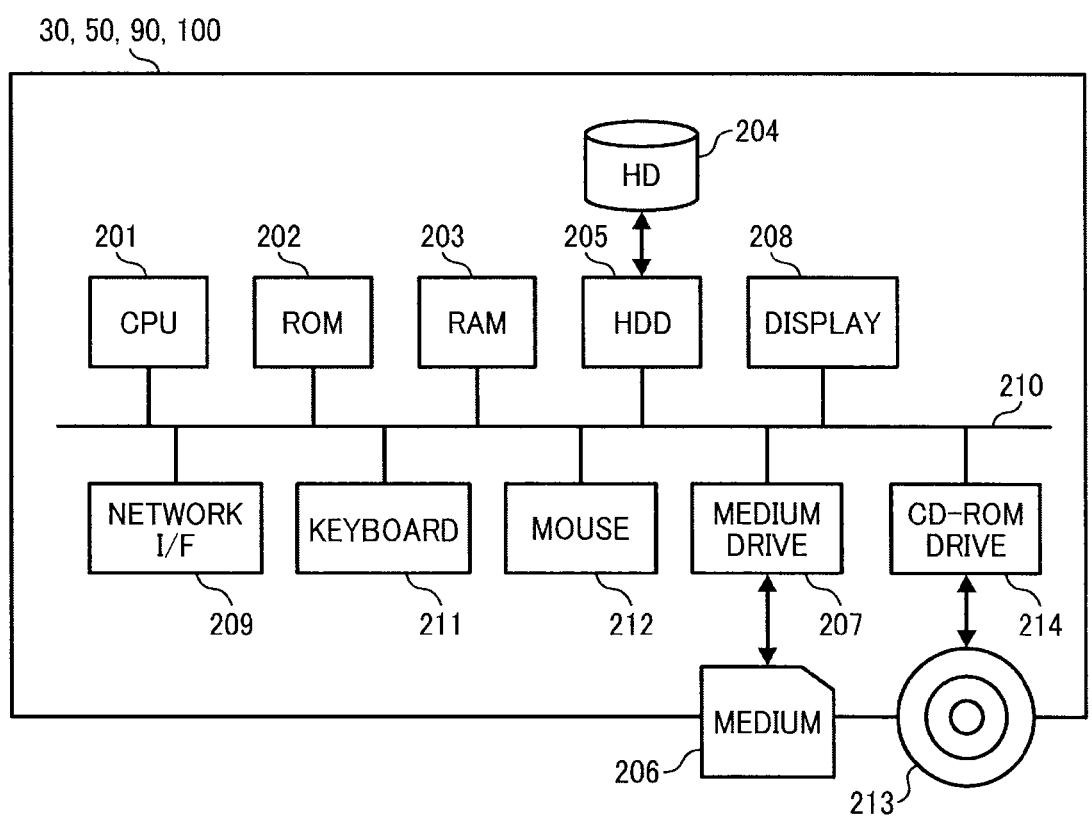
FIG. 6 is a schematic block diagram illustrating a hardware structure of any one of the transmission management system, relay terminal, program providing system, and maintenance system of the transmission system of FIG. 1.

FIG. 6 illustrates a hardware structure of the management system 50 of FIG. 1. The management system 50 includes a CPU 201, a ROM 202, a RAM 203, the HD 204, a hard disk drive (HDD) 205, a medium drive 207, a display 208, a network interface (I/F) 209, a keyboard 211, a mouse 212, and a CD-ROM drive 214, which are electrically connected through a bus 210 such as an address bus or a data bus.

The CPU 201 controls entire operation of the management system 50. The ROM 202 stores a control program for execution by the CPU 201, such as an IPL. The RAM 203 functions as a work area of the CPU 201. The HD 204 stores therein various data such as the transmission management program. The HDD 205 controls reading or writing of various data with respect to the HD 204 under control of the CPU 201. The medium drive 207 controls reading or writing of various data with respect to a removable recording medium 206 such as a flash memory. The display 208 displays various data such as a cursor, menu, window, character, or image. The network I/F 209 allows the management system 50 to transmit data through the communication network 2. The keyboard 211 includes a plurality of keys, each of which is used for inputting a user instruction through a character, a numeral, or a symbol. The mouse 212 allows the user to input a user instruction including, for example, selection or execution of a specific instruction, selection of an area to be processed, and instruction of cursor movement. The CD-ROM drive 214 controls reading or writing of various data with respect to a CD-ROM 213. In alternative to the CD-ROM 213, any removable recording medium may be used.

The transmission management program may be written onto a recording medium that is readable by a general-purpose computer such as the recording medium 206 or the CD-ROM 213 in any format that is installable or executable by a general-purpose computer. Once the transmission management program is written onto the recording medium, the recording medium may be distributed. Further, the transmission management program may be stored in any desired memory other than the HD 204, such as the ROM 202.

The relay terminal 30 is substantially similar in hardware structure to the management system 50 of FIG. 6, except for replacement of the management program with a relay terminal control program that is used for controlling the relay terminal 30. The relay terminal control program may be written onto a recording medium that is readable by a general-purpose computer such as the recording medium 206 or the CD-ROM 213 in any format that is installable or executable by the general-purpose computer. Once the relay terminal control program is written onto the recording medium, the recording medium may be distributed. Further, the relay terminal control program may be stored in any desired memory other than the HD 204, such as the ROM 202.

The program providing system 90 is substantially similar in hardware structure to the management system 50 of FIG. 6, except for replacement of the management program with a program providing program that is used for controlling the program providing system 90. The program providing program may be written onto a recording medium that is readable by a general-purpose computer such as the recording medium 206 or the CD-ROM 213 in any format that is installable or executable by the general-purpose computer. Once the program providing program is written onto the recording medium, the recording medium may be distributed. Further, the program providing program may be stored in any desired memory other than the HD 204, such as the ROM 202.

Other examples of removable recording medium, which may be used in replace of the CD-ROM 213, include, but not limited to, compact disc recordable (CD-R), digital versatile disk (DVD), and blue ray disc.

Figure 7:
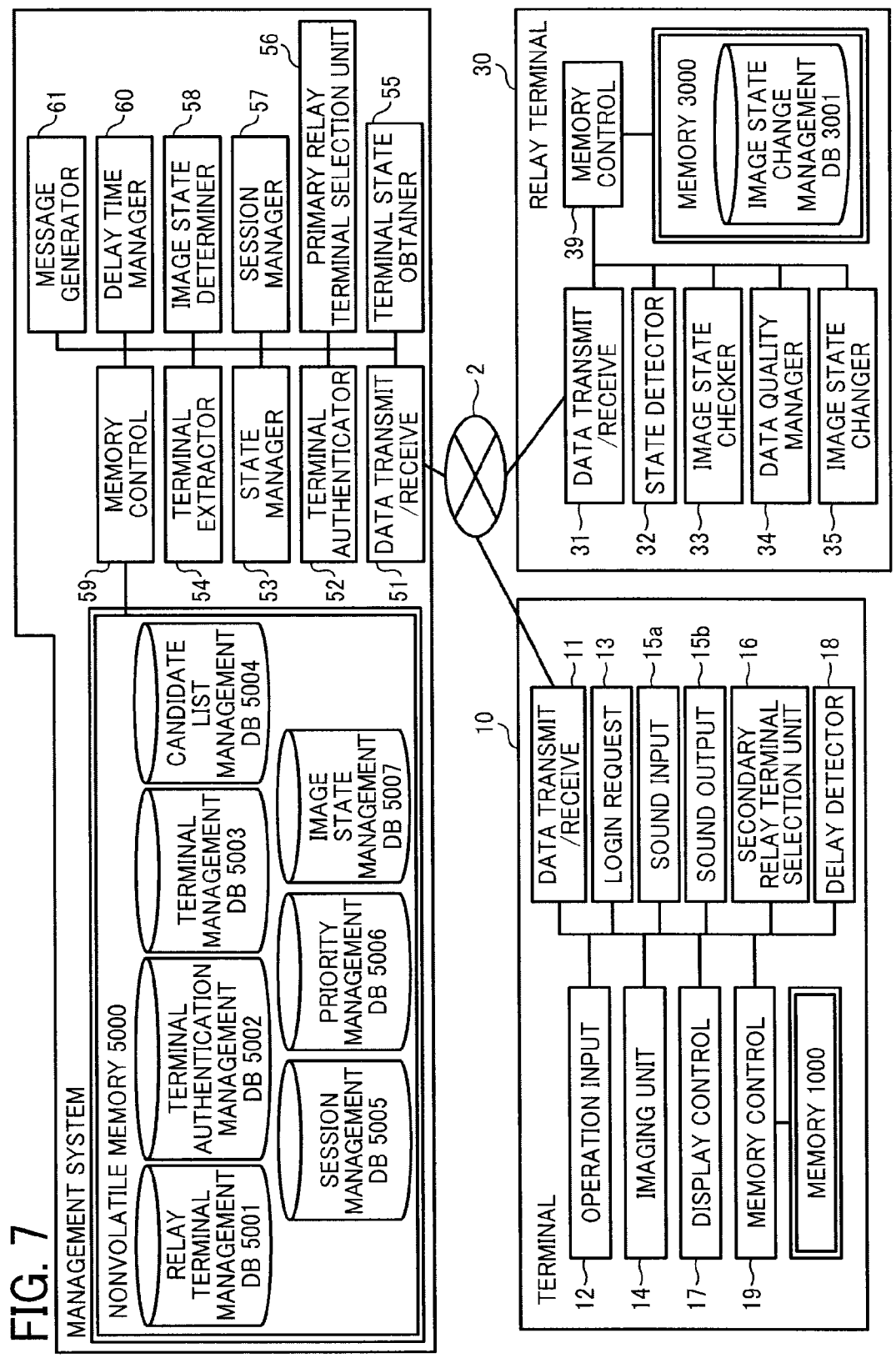
FIG. 7 is a schematic block diagram illustrating a functional structure of the transmission system of FIG. 1.

Next, a functional structure of the transmission system of FIG. 1 is explained according to an example embodiment of the present invention. FIG. 7 is a schematic block diagram illustrating functional structures of the transmission system 1. As illustrated in FIG. 7, the terminal 10, the relay terminal 30, and the management system 50 exchange data with one another through the communication network 2. In FIG. 7, the program providing system 90 and the maintenance system 100 of FIG. 1 are omitted.

<Functional Structure of Terminal>

The terminal 10 includes a data transmit/receive 11, an operation input 12, a login request 13, an imaging unit 14, a sound input 15a, a sound output 15b, a secondary relay terminal selection unit 16, a display control 17, a delay detector 18, and a memory control 19. These units shown in FIG. 7 correspond to a plurality of functions or functional modules, which are executed according to an instruction of the CPU 101 (FIG. 5) that is generated according to the terminal control program being loaded from the flash memory 104 onto the RAM 103. The terminal 10 further includes a memory 1000 that may be implemented by the flash memory 104 and the RAM 103 of FIG. 5.

Referring now to FIGS. 5 and 7, a functional structure of the terminal 10 is explained according to an example embodiment of the present invention. More specifically, in this example, the operations or functions that are performed by the terminal 10, which include the operations or functions performed by the units shown in FIG. 7, are performed in relation to one or more hardware devices of the terminal 10 that are shown in FIG. 5.

The data transmit/receive 11, which may be implemented by the network I/F 111 (FIG. 5) under control of the CPU 101, transmits or receives various data or information to or from another terminal, device, or system, through the communication network 2. In this example, the data transmit/receive 11 starts receiving the operation state information that indicates the operation state of each candidate counterpart terminal 10 from the management system 50, before starting communication with any counterpart terminal 10B. The operation state of the candidate terminal 10 indicates whether the candidate terminal 10 is online or offline. When the terminal 10 is online, the operation state of the candidate terminal 10 further indicates whether the candidate terminal 10 is available for communication ("communication OK"), the candidate terminal 10 is having communication with the other terminal ("communicating"), the candidate terminal 10 is online but transmission of image data is interrupted ("online, interrupt"), the candidate terminal 10 is on line but in mute state ("online, mute"), or the candidate terminal 10 is online but in trouble or error ("online, communicating, trouble"). For example, when the cable 120c is disconnected from the terminal 10, the operation state of the candidate terminal 10 is assumed to be in the trouble state.

The operation input 12 receives a user instruction input by the user through the operation button 108 or the power switch 109 (FIG. 5), under control of the instructions received from the CPU 101. For example, when the user selects "ON" using the power switch 109, the operation input 12 receives a user instruction for turning the power on, and causes the terminal 10 to turn on the power.

The operations or functions of the login request 13 are performed according to an instruction received from the CPU 101 (FIG. 5). When the power of the terminal 10 is turned on, the login request 13 automatically causes the data transmit/receive 11 to send login request information that requests the login process, and a current IP address of the terminal 10, to the management system 50 through the communication network 2. When the power of the terminal 10 is turned off according to a user instruction received from the user through the power switch 109, the login request 13 causes the data transmit/receive 11 to send current operation state information of the terminal 10 to the management system 50, which indicates that the power of the terminal 10 is turned off. After the operation state information is sent, the operation input 12 turns off the power of the terminal 10. As the operation state information of the terminal 10 is sent every time the power is turned off, the management system 50 is able to know that the terminal 10 is off-line in realtime.

The operations or functions of the imaging unit 14 of the terminal 10 are performed by the camera 112 and the imaging element I/F 113 according to an instruction received from the CPU 101 (FIG. 5). The imaging unit 14 takes an image of an object to output image data of the object.

The operations or functions of the sound input 15a of the terminal 10 are performed by the sound I/O I/F 116 according to an instruction received from the CPU 101, in cooperation with the microphone 114. After the microphone 114 converts voice of the user at the terminal 10 to a voice signal, the sound input 15a inputs the sound signal in the form of sound data for further processing. The operations or functions of the sound output 15b of the terminal 10 are performed by the sound I/O I/F 116 according to an instruction received from the CPU 101, in cooperation with the speaker 115. The sound output 15b outputs a sound signal of sound data that is received from the counterpart terminal 10 through the speaker 115.

Figure 8:
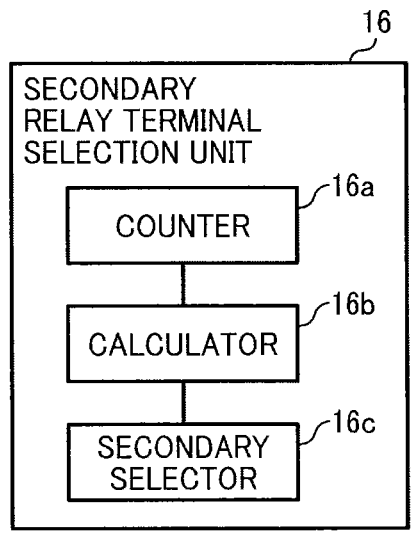
FIG. 8 is a schematic block diagram illustrating a functional structure of a secondary selection unit of the terminal of FIG. 7.

The secondary relay terminal selection unit 16 selects one of the relay terminals 30 that is suitable for communication to start videoconference. More specifically, according to an instruction received from the CPU 101 (FIG. 5), the secondary relay terminal selection unit 16 performs selection of the relay terminal 30 using a counter 16a, a calculator 16b, and a secondary selector 16c, as illustrated in FIG. 8.

The counter 16a obtains date and time information indicating the date and time at which the data transmit/receive 11 of the terminal 10 receives preparatory transmit information when the preparatory transmit information is transmitted from another terminal 10. The calculator 16b calculates a time period T between the time when the preparatory information is transmitted by another terminal 10 and the time when the preparatory information is received at the terminal 10, based on the difference between the time and date information obtained by the counter 16a and time and date information included in the preparatory transmit information. The secondary selector 16b selects one of the relay terminals 10 having the minimum value of the time period t calculated by the calculator 16b.

The operations or functions of the display control 17 of the terminal 10 of FIG. 7 are performed by the display I/F 117 according to an instruction received from the CPU 101. The display control 17 controls transmit of image data, which is generated based on image data of different resolutions, to the display 120. The display control 17 further causes the display 120 that is provided for the request terminal 10A to display a candidate list before the request terminal 10A starts videoconference with a desired counterpart terminal 10B. The display controller 17 further causes the display 120 to display a message, which may be received from the management system 50, to the user.

The delay detector 18 detects a delay time ms indicating a time period in which contents data such as image data or sound data sent through the relay terminal 30 from another terminal 10 is delayed, according to an instruction received from the CPU 101 (FIG. 5).

The memory control 19 is implemented by the SSD 105 of FIG. 5 according to an instruction received from the CPU 101. The memory control 19 stores various data in the memory 1000, or reads out various data from the memory 1000. The memory 1000 stores therein various data such as terminal identification (ID) information for identifying the terminal 10, and a password for authenticating a user at the terminal 10. The memory 1000 further stores therein image data and/or sound data received as the terminal 10 communicates with a counterpart terminal 10 such that the image data and/or sound data are overwritten. Before the image data is overwritten, an image generated based on the image data is displayed onto the display 120. Before the sound data is output, sounds generated based on the sound data is output through the speaker 150.

In this example, any one of the terminal ID of the terminal 10 and the relay terminal ID of the relay terminal 30 includes any type of identification information that can be expressed by any language, character, symbol, mark, or any combination of language, character, symbol, and mark.

<Functional Structure of Relay Terminal>

Now, a functional structure of the relay terminal 30 is explained. The relay terminal 30 includes a data transmit/receive 31, a state detector 32, an image state checker 33, a data quality manager 34, an image state changer 35, and a memory control 39. These units shown in FIG. 7 correspond to a plurality of functions or functional modules, which are executed according to an instruction of the CPU 201 (FIG. 6) that is generated according to the relay terminal control program being loaded from the HD 204 onto the RAM 203. The relay terminal 30 further includes a memory 3000 that may be implemented by the RAM 203 and/or the HD 204 (FIG. 6).

(Image State Change Management Table)

The memory 3000 includes an image state change management database (DB) 3001, which stores an image state change management table illustrated in FIG. 10. The image state change management table of FIG. 10 stores an Internet protocol (IP) address of the counterpart terminal 10B to which image data is transmitted through the relay terminal 30, in association with image state information. The image state information indicates quality of image data to be transmitted through the relay terminal 30 to the counterpart terminal 10B, or whether to interrupt transmission of the image data to the counterpart terminal 10B.

<Functional Structure of Relay Terminal>

Next, a functional structure of the relay terminal 30 is explained according to an example embodiment of the present invention. More specifically, in this example, the operations or functions that are performed by the relay terminal 30, which include the operations or functions performed by the units shown in FIG. 7, are performed in relation to one or more hardware devices of the relay terminal 30 that are shown in FIG. 6.

The data transmit/receive 31, which may be implemented by the network I/F 209 (FIG. 6), transmits or receives various data or information to or from another terminal, device, or system, through the communication network 2, under control of instructions received from the CPU 201.

The state detector 32, which is implemented by the CPU 201 of FIG. 6, detects an operation state of the relay terminal 30. For example, the operation state includes the on-line state ("online"), the off-line state ("offline"), the communicating state ("communicating"), and the interrupted state ("interrupted"). The on-line state is a state in which the relay terminal 30 is turned on and available for data transmission/reception. The off-line state is a state in which the relay terminal 30 is not available for data transmission/reception, for example, as the power is not turned on.

The image state checker 33, which is implemented by the CPU 201 of FIG. 6, searches the image state change management DB 3001 (FIG. 10) using the IP address of the counterpart terminal 10B as a search key to extract the image state information regarding the quality of image data suitable to communication with the counterpart terminal 10B or information whether transmission of the image data is interrupted.

The data quality manager 34, which may be implemented by the CPU 201 of FIG. 6, changes the contents of the image state change management DB 3001 based on the image state information that is received from the management system 50, such as image quality information indicating the desired quality of image data. For example, assuming that the request terminal 10aa having the terminal ID "01aa" communicates with the counterpart terminal 10db having the terminal ID "01db" to transmit or receive high quality image data during videoconference, transmission of image data may delay for various reasons. For example, if a request terminal 10bb and a counterpart terminal 10ca start videoconference over the communication network 2, transmission of image data from the request terminal 10aa to the counterpart terminal 10db tends to slow down due to the increase in traffic. In such case, the relay terminal 30 changes the quality of image data to be transmitted from high image quality to lower image quality. More specifically, the contents in the image state change management DB 3001 is changed from high-level image quality to medium-level image quality, based on the image state information indicating the use of medium-level image quality.

The image state changer 35, which may be implemented by the CPU 201 of FIG. 6, changes the quality of image data received from the request terminal 10 to the quality of image data according to the contents of the image state change management DB 3001, such as the quality information of the image data. Alternatively, the image state changer 35 may interrupt transmission of the image data received from the request terminal 10, according to the contents of the image state change management DB 3001, such as information indicating interruption of image data.

The memory control 39 is implemented by the HDD 205 of FIG. 6 according to an instruction received from the CPU 201. The memory control 39 stores various data in the memory 3000, or reads out various data from the memory 3000.

<Functional Structure of Management System>

The management system 50 includes a data transmit/receive 51, a terminal authenticator 52, a state manager 53, a terminal extractor 54, a terminal state obtainer 55, a primary relay terminal selection unit 56, a session manager 57, an image state determiner 58, a memory control 59, a delay time manager 60, and a message generator 61. These units shown in FIG. 7 correspond to a plurality of functions or functional modules, which are executed according to an instruction of the CPU 201 (FIG. 6) that is generated according to the transmission management program being loaded from the HD 204 onto the RAM 203. The management system 50 further includes a memory 5000, which may be implemented by the HID 204 (FIG. 6).

(Relay Terminal Management Table)

The memory 5000 includes a relay terminal management database (DB) 5001, which stores therein a relay terminal management table of FIG. 11. The relay terminal management table of FIG. 11 stores, for each relay terminal ID of the terminal 10, the operation state of the relay terminal 30, the received date and time at which the management system 50 receives the operation state information indicating the operation state of the relay terminal 30 from the relay terminal 30, the IP address of the relay terminal 30, and the maximum data transmission speed of the relay terminal 30 in Mbps. For example, for the relay terminal 30a having the relay terminal ID "111a", the relay terminal management table indicates that the operation state is "ON LINE", the received date and time at which the management system 50 receives the operation state information is "13:00 PM of Nov. 10, 2009", the IP address of the relay terminal 30a is "1.2.1.2", and the maximum data transmission speed of the relay terminal 30a is 100 Mbps.

(Terminal Authentication Management Table)

The memory 5000 further includes a terminal authentication management database (DB) 5002, which stores a terminal authentication management table of FIG. 12. The terminal authentication management table of FIG. 12 stores a plurality of terminal IDs respectively assigned to the terminals 10 that are managed by the management system 50, in association with a plurality of passwords that are previously determined for the respective terminals 10. For example, referring to the terminal authentication management table of FIG. 12, the terminal 10aa having the terminal ID "01aa" is assigned with the password "aaaa".

(Terminal Management Table)

The memory 5000 further includes a terminal management database (DB) 5003, which stores a terminal management table of FIG. 13. The terminal management table of FIG. 13 stores, for each one of the terminal IDs assigned to the terminals 10, the terminal name to be used for communication with the terminal 10, the operation state of the terminal 10, the received date and time at which the management system 50 receives the login request information from the terminal 10, and the IP address of the terminal 10. For example, for the terminal 10aa having the terminal ID "01aa", the terminal management table of FIG. 13 indicates that the terminal name is "Japan Tokyo Office AA terminal", the operation state is online ("ONLINE") and is available for communication ("COMMUNICATION OK"), the received date and time is "13:40 PM, Nov. 10, 2009", and the IP address of the terminal 10aa is "1.2.1.3".

(Candidate List Management Table)

The memory 5000 further includes a candidate list management database (DB) 5004, which stores a candidate list management table of FIG. 14. The candidate list management table of FIG. 14 stores, for each one of a plurality of request terminals 10A capable of requesting for videoconference communication, the terminal ID of the request terminal 10A, and one or more terminal IDs that are respectively assigned to candidate terminals 10 that are previously registered for the request terminal 10A. In this example, for the request terminal 10A, one or more terminals 10 of the communication system 1 of FIG. 1 are previously registered as the candidate terminal 10. For example, the candidate list management table of FIG. 14 indicates that the request terminal 10aa having the terminal ID "01aa" is most likely to request for videoconference with respect to the terminal 10ab having the terminal ID "01ab", the terminal 10ba having the terminal ID "01 ba", and the terminal 10bb having the terminal ID "01bb", etc. The management system 50 manages the candidate list management table of FIG. 14, for example, according to a user instruction received from any one of the terminals 10. For example, in response to a user instruction received from the terminal 10aa, the management system 50 may add or delete the contents of the candidate list management table of FIG. 14.

(Session Management Table)

The memory 5000 further includes a session management database (DB) 5005, which stores a session management table of FIG. 15. The session management table of FIG. 15 stores information regarding each of the sessions that are carried out by at least two terminals 10 of the transmission system 1 for the purpose of selecting the relay terminal 30 that is most suitable for communication between at least two terminals 10. More specifically, for each session ID that uniquely identifies each session, the session management table of FIG. 15 stores a relay terminal ID of the relay terminal 30 to be used for transmitting or receiving contents data such as image data and sound data, a terminal ID of the request terminal 10A, a terminal ID of the counterpart terminal 10B, a delay time ms indicating a time period required for receiving contents data at the counterpart terminal 10B, the date and time information indicating the time at which the management system 50 receives delay information from the counterpart terminal 10B.

For example, referring to the session management table of FIG. 15, for the session having the session ID "se1", the relay terminal 30a having the relay terminal ID "111a" is selected to relay contents data between the request terminal 10aa having the terminal ID "01aa" and the counterpart terminal 10db having the terminal ID "01db". Further, the management system 50 receives the delay information from the counterpart terminal 10db at 14:00 PM, Nov. 10, 2009. Based on the delay information, the delay time ms of 200 milliseconds (ms) is obtained. In case of having videoconference between only two terminals 10, the time at which the delay time is received may be determined based on the time when the management system 50 receives the delay information transmitted from the request terminal 10A rather than based on the time when the management system 50 receives the delay information transmitted from the counterpart terminal 10B. In case of having videoconference with more than two terminals 20, the delay information transmitted from the counterpart terminal 10 that receives the contents data is used to manage the date and time at which the delay information is received.

(Address Priority Management Table)

The memory 5000 further includes a priority management database (DB) 5006, which stores an address priority management table of FIG. 16. The address priority management table of FIG. 16 defines a number of address priority points to be assigned to an arbitrary set of terminal 10 and relay terminal 30 based on the degree of similarity between the IP address of the terminal 10 and the IP address of the relay terminal 30. Assuming that the IP address of the terminal 10 and the IP address of the relay terminal 30 are each expressed in the form of four digital numbers as described above referring to FIG. 1, as the degree of similarity between the terminal IP address and the relay terminal IP address increases, a larger number of address priority points is assigned. In FIG. 16, the "S" indicates that one digit of the IP address, which may be referred to as the dot address, is the same for both of the terminal 10 and the relay terminal 30. The "D" indicates that one digit of the IP address, or the dot address, is different between the terminal 10 and the relay terminal 30.

More specifically, in this example, when the first to third digits or dot addresses are the same between the terminal 10 and the relay terminal 30, the address priority point is 5. When the first and second digits or dot addresses are the same between the terminal 10 and the relay terminal 30, the address priority point is 3. In such case, the fourth digit or dot address does not affect the address priority point. When the first digit or dot address is the same between the terminal 10 and the relay terminal 30, the address priority point is 1. In such case, the third and fourth digits or dot addresses do not affect the address priority point. When the first digit or dot address is different between the terminal 10 and the relay terminal 30, the address priority point is 0. In such case, the second to fourth digits or dot addresses do not affect the address priority point.

(Transmission Speed Priority Management Table)

The priority management DB 5006 of the memory 5000 further includes a transmission speed priority management table of FIG. 17. The transmission speed priority management table of FIG. 17 stores a range of the maximum data transmission speeds in association with a transmission speed priority point. More specifically, the transmission speed priority management table of FIG. 17 indicates that the transmission speed priority point increases with the increase in value of the maximum data transmission speeds at the relay terminal 30. For example, referring to FIG. 17, when the maximum data transmission speed at the relay terminal 30 is equal to or greater than 1000 Mbps, the transmission speed priority point of 5 is assigned. For example, when the maximum data transmission speed at the relay terminal 30 is equal to or greater than 100 Mbps but less than 1000 Mbps, the transmission speed priority point of 3 is assigned. When the maximum data transmission speed at the relay terminal 30 is equal to or greater than 10 Mbps but less than 100 Mbps, the transmission speed priority point of 1 is assigned. When the maximum data transmission speed at the relay terminal 30 is less than 10 Mbps, the transmission speed priority point of 0 is assigned.

(Image State Management Table)

The memory 5000 further includes an image state management database (DB) 5007, which stores an image state management table of FIG. 18. The image state management table of FIG. 18 stores the delay time ms of image data in association with the image state information. More specifically, the image data management table of FIG. 18 indicates that the quality of image data to be processed by the relay terminal 30 is lowered, as the delay time ms of the image data at the request terminal 10A or the counterpart terminal 10B increases. For example, when the delay time ms is equal to or greater than 0 milliseconds (ms), but less than 100 ms, the image data quality is high. When the delay time ms is equal to or greater than 100 ms but less than 300 ms, the image data quality is medium. When the delay time ms is equal to or greater than 300 but less than 500 ms, the image data quality is low. When the delay time ms is equal to or greater than 500 ms, the management system 50 interrupts operation of transmitting data.

(Functional Structure of Management System)

Next, a functional structure of the management system 50 is explained according to an example embodiment of the present invention. In this example, the operations or functions that are performed by the management system 50, which include the operations or functions performed by the units shown in FIG. 7, are performed in relation to one or more hardware devices of the management system 50 that are shown in FIG. 6.

The data transmit/receive 51, which may be implemented by the network I/F 209 (FIG. 6) according to an instruction received from the CPU 201, transmits or receives various data or information to or from another terminal, device, or system through the communication network 2.

Under control of the CPU 201 (FIG. 6), the terminal authenticator 52 obtains a terminal ID and a password from the login request information that is received from the data transmit/receive 51. Using the terminal ID and the password as a search key, the terminal authenticator 52 searches the terminal authentication management DB 5002 (FIG. 12) to determine whether the obtained set of terminal ID and password is registered. Based on the search result, the terminal authenticator 52 determines whether the user at the terminal 10 or the terminal 10 is allowed for access.

The state manager 53, which operates according to an instruction received from the CPU 201 (FIG. 6), manages the operation state of the request terminal 10 that sends the login request information, using the terminal management DB 5003 (FIG. 13). The terminal management DB 5003 stores therein the terminal ID of the request terminal 10A, the operation state of the request terminal 10A, the date/time at which the login information is received at the management system 50, and the IP address of the request terminal 10A, in association with one another. For example, when the power of the terminal 10 is switched from the ON state to the OFF state according to a user instruction received through the power switch 109, the state manager 53 receives the operation state information of the terminal 10 indicating that the terminal 10 is turned off, from the terminal 10. Based on the operation state information of the terminal 10, the state manager 53 changes the operation state information of the terminal 10 that is stored in the terminal management DB 5003 from the on-line state to the off-line state.

The terminal extractor 54, which operates according to an instruction received from the CPU 201 (FIG. 6), searches the candidate list management DB 5004 (FIG. 14) using the terminal ID of the request terminal 10A that sends the login request information as a key to obtain a list of terminal IDs each being assigned to a plurality of candidate terminals 10 for the request terminal 10A. Additionally, the terminal extractor 54 searches the candidate list management DB 5004 (FIG. 14) using the terminal ID of the request terminal 10A that sends the login request as a key to obtain a terminal ID of another request terminal 10A that registers the request terminal 10A as a candidate terminal for another request terminal 10A.

The terminal state obtainer 55, which operates under control of the CPU 201 (FIG. 6), searches the terminal management DB 5003 (FIG. 13) using the terminal ID of each candidate terminal 10 that is extracted by the terminal extractor 54 as a key to obtain the operation state information of each candidate terminal 10. More specifically, the terminal state obtainer 55 obtains the operation state of each candidate counterpart terminal 10 that is previously registered as a candidate counterpart terminal for the request terminal 10A that sends the login request information. Further, the terminal state obtainer 55 searches the terminal management DB 5003 using the terminal ID of the request terminal 10A that is extracted by the terminal extractor 54 as a key to obtain the operation state information of the request terminal 10A that sends the login request information. Further, the terminal state obtainer 55 searches the terminal management DB 5003 using the terminal ID of a candidate request terminal 10A that is extracted by the terminal extractor 54 as a key to obtain the operation state information of the candidate request terminal 10A that lists the request terminal 10A that sends the login request information as a candidate counterpart terminal.

Figure 9:
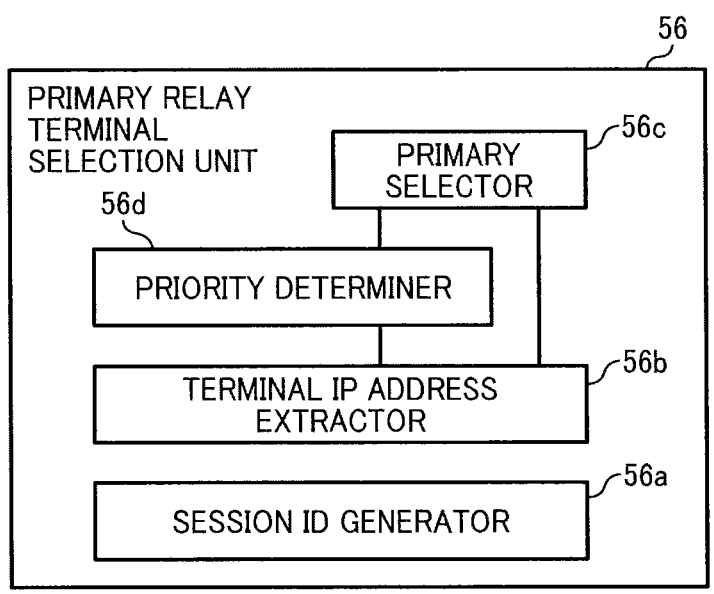
FIG. 9 is a schematic block diagram illustrating a functional structure of a primary selection unit of the management system of FIG. 7.

The primary relay terminal selection unit 56, which operates according to an instruction received from the CPU 201 (FIG. 6), limits a number of relay terminals 30 each of which is a candidate relay terminal 30 that may be used for relaying contents data between at least two terminals 10. Based on the result obtained by the primary relay terminal selection unit 56, the secondary relay terminal selection unit 16 of the terminal 10 selects one terminal 30 that is most suitable for communication between at least two terminals 10. As illustrated in FIG. 9, the primary relay terminal selection unit 56 includes a session ID generator 56a, a terminal IP address extractor 56b, a primary selector 56c, and a priority determiner 56d.

The session ID generator 56a of the primary relay terminal selection unit 56 generates a session ID for identifying a session that is used for selecting the relay terminal 30. The terminal IP address extractor 56b extracts the terminal ID of the request terminal 10A and the terminal ID of the counterpart terminal 10B respectively from the session request information received from the request terminal 10A, and searches the terminal management DB 5003 (FIG. 13) to obtain the IP address of the request terminal 10A and the IP address of the counterpart terminal 10B. The primary selector 56c selects one or more relay terminals 30 having the online state from the relay terminal management DB 5001 (FIG. 11) to obtain the relay terminal ID of the selected relay terminal 30. In this example, it is assumed that more than two relay terminals 30 are selected as having the on-line state.

Further, the primary selector 56c obtains the IP address of each of the selected relay terminals 30. Once the IP address of the relay terminal 30 is obtained for each relay terminal 30, the primary selector 56c compares the IP address of the relay terminal 30 with at least one of the IP address of the request terminal 10A and the IP address of the counterpart terminal 10B that are respectively obtained by the terminal IP address extractor 56b to analyze the degree of similarity between the IP address of the terminal 10 and the IP address of the relay terminal 30. More specifically, the primary selector 56c compares between the IP address of the terminal 10 and the IP address of the relay terminal 30, digit by digit, or dot address by dot address, to determine the degree of similarity. Using the address priority management table of FIG. 16, the primary selector 56c obtains the address priority point for each one of the relay terminals 30. Assuming that the primary selector 56c compares the IP address of the terminal 10 with the IP address of the relay terminal 30, respectively for the request terminal 10A and the counterpart terminal 10B, the primary selector 56c obtains two address priority points for each one of the relay terminals 30. In such case, the primary selector 56c selects the highest one of the address priority points as the address priority point for the relay terminal 30. For each of the relay terminals 30, the primary selector 56c obtains a total priority point by adding the address priority point and the transmission speed priority point together. In this example, the primary selector 56c selects two relay terminals 30 including the relay terminal 30 having the highest total priority point and the relay terminal 30 having the second highest total priority point. In this example, a number of relay terminals 30 that is finally selected by the primary selector 56c is not limited to two such that more than two relay terminals 30 may be finally selected for further processing as long as a number of relay terminals 30 is sufficiently reduced.

The priority determiner 56d refers to the priority management DB 5006 (FIG. 16) to determine the address priority point for each one of the relay terminals 30 that is selected by the primary selector 56c. The priority determiner 56d obtains the maximum data transmission speed of the relay terminal 30 from the relay terminal management DB 5001 (FIG. 11), and refers to the priority management DB 5006 (FIG. 17) to obtain the transmission speed priority point of the relay terminal 30 that is selected by the primary selector 56c.

The session manager 57, which operates according to an instruction received from the CPU 201, stores the session ID generated by the session ID generator 56a, the terminal ID of the request terminal 10, and the terminal ID of the counterpart terminal 10, in a corresponding manner, in the session management DB 5005 (FIG. 15) of the memory 5000. The session manager 57 further stores the relay terminal ID of the relay terminal 30 that is finally selected by the secondary selector 16b of the terminal 10 for each session ID, in the session management DB 5005 (FIG. 15).

The image state determiner 58, which operates according to an instruction received from the CPU 201 (FIG. 6), searches the image state management DB 5007 (FIG. 18) using the delay time ms obtained for the selected relay terminal 30 to obtain the image state information. The image state information is used to determine image quality that is desirable for communication using the relay terminal 30 or to determine whether transmission of the image data should be interrupted.

The memory control 59 is implemented by the HDD 205 of FIG. 6 according to an instruction received from the CPU 201. The memory control 59 stores various data in the memory 5000, or reads out various data from the memory 5000.

The delay time manager 60 searches the terminal management DB 5003 (FIG. 13) using the IP address of the counterpart terminal 10B to obtain the terminal ID of the counterpart terminal 10B. The delay time manager 60 further manages the session management table of FIG. 15 stored in the session management DB 5005 so as to keep updated the value stored in the "delay time" field for the obtained terminal ID of the counterpart terminal 10B.

The message generator 61 searches the image state management DB 5007 (FIG. 18) using the delay information received at the data transmit/receive 51 as a search key to obtain image state information that is associated with the received delay information. When the image state information indicates that transmission of image data should be interrupted, the message generator 61 generates a message indicating that image data is not transmitted or only sound data (voice data) is transmitted. More specifically, the message generator 61 searches the terminal management DB 5003 (FIG. 13) using the address information that is received by the data transmit/receive 51 together with the delay information as a search key to obtain a terminal ID of the terminal 10 having the received address information. The message generator 61 further searches the session management DB 5005 (FIG. 15) using the terminal ID as a search key to obtain a terminal ID of the terminal having communication with the terminal 10 that is specified. The message generator 61 further searches the terminal management DB 5003 (FIG. 13) using the terminal ID of the terminal 10 as a search key to obtain a terminal name of the terminal 10. The message generator 61 generates a message, which includes the terminal name of the terminal 10.

<Operation of Transmission System>

Figure 19:
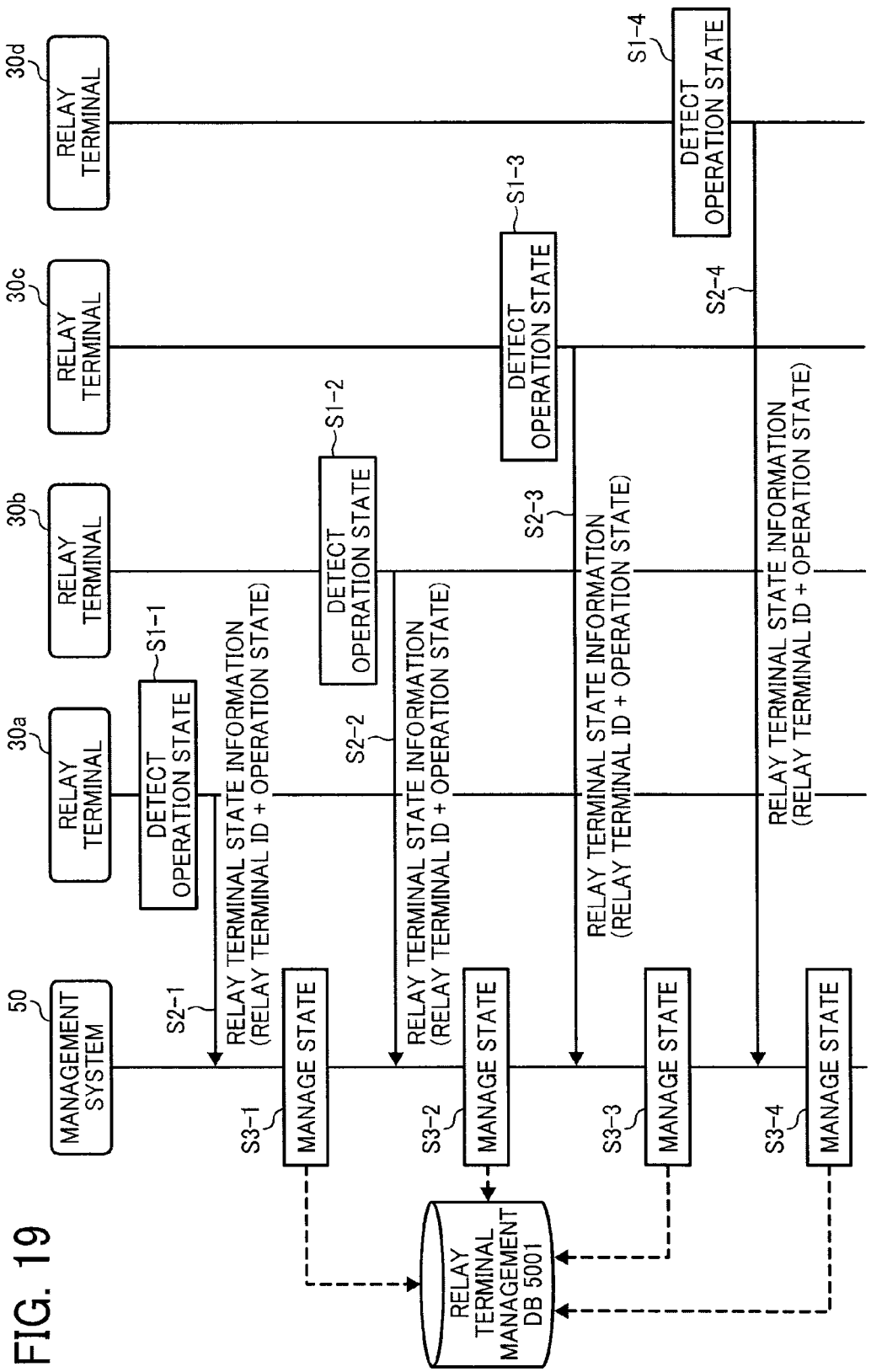
FIG. 19 is a data sequence diagram illustrating operation of managing state information indicating an operation state of the relay terminal, according to an example embodiment of the present invention.
Figure 20:
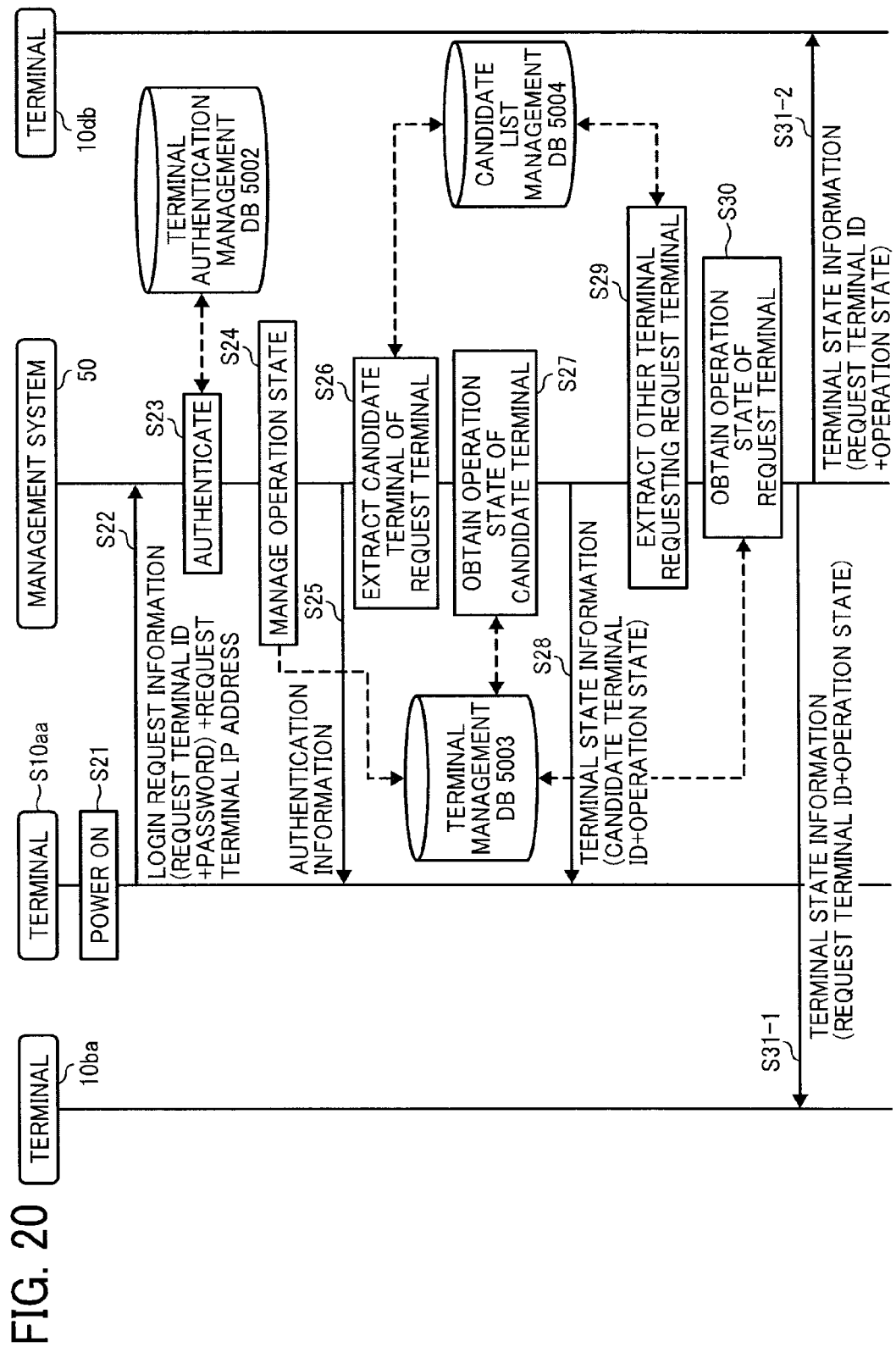
FIG. 20 is a data sequence diagram illustrating operation of establishing communication among two or more terminals of the transmission system of FIG. 1, according to an example embodiment of the present invention.
Figure 21:
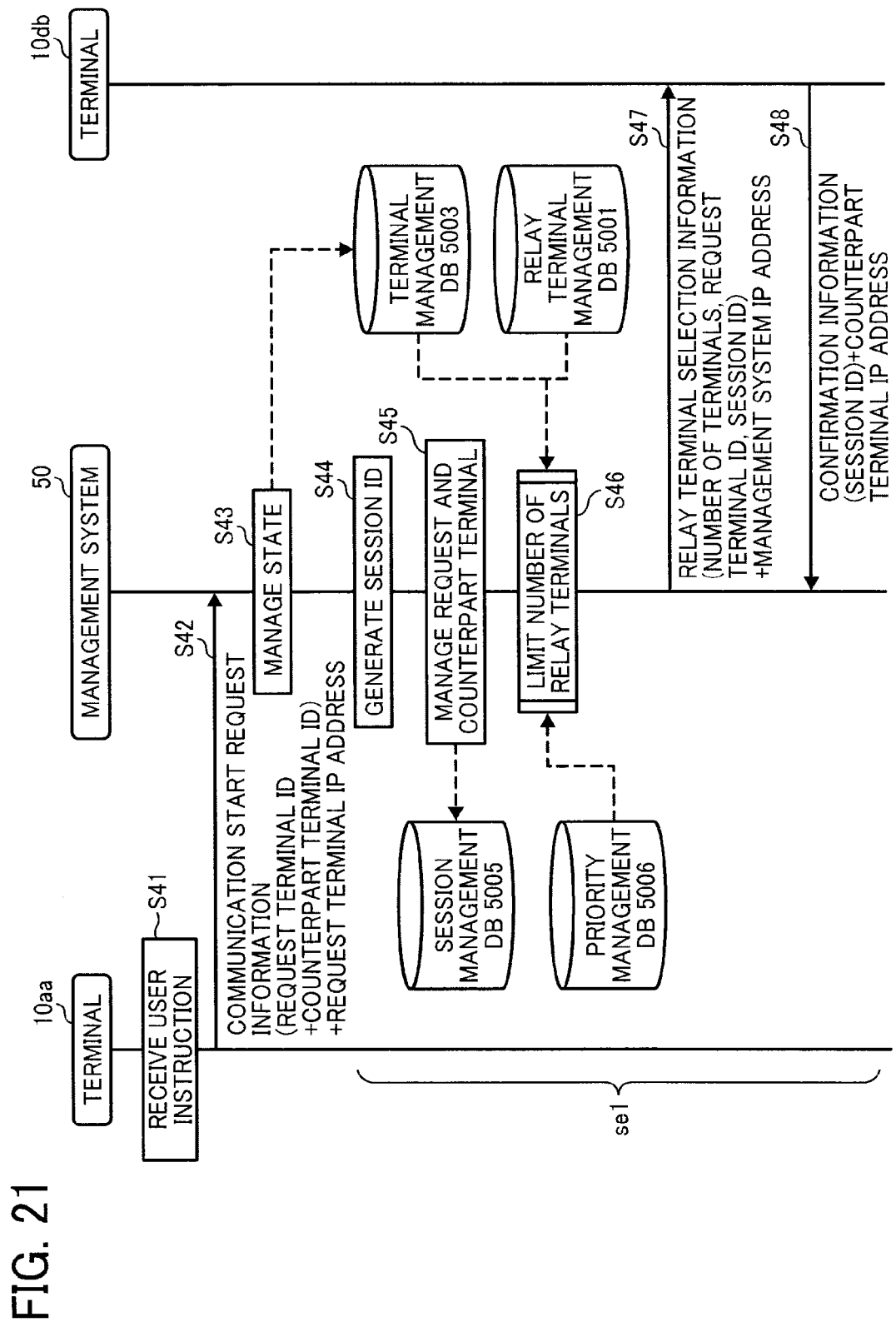
FIG. 21 is a data sequence diagram illustrating operation of limiting a number of candidate relay terminals, performed by the transmission system of FIG. 1 according to an example embodiment of the present invention.
Figure 22:
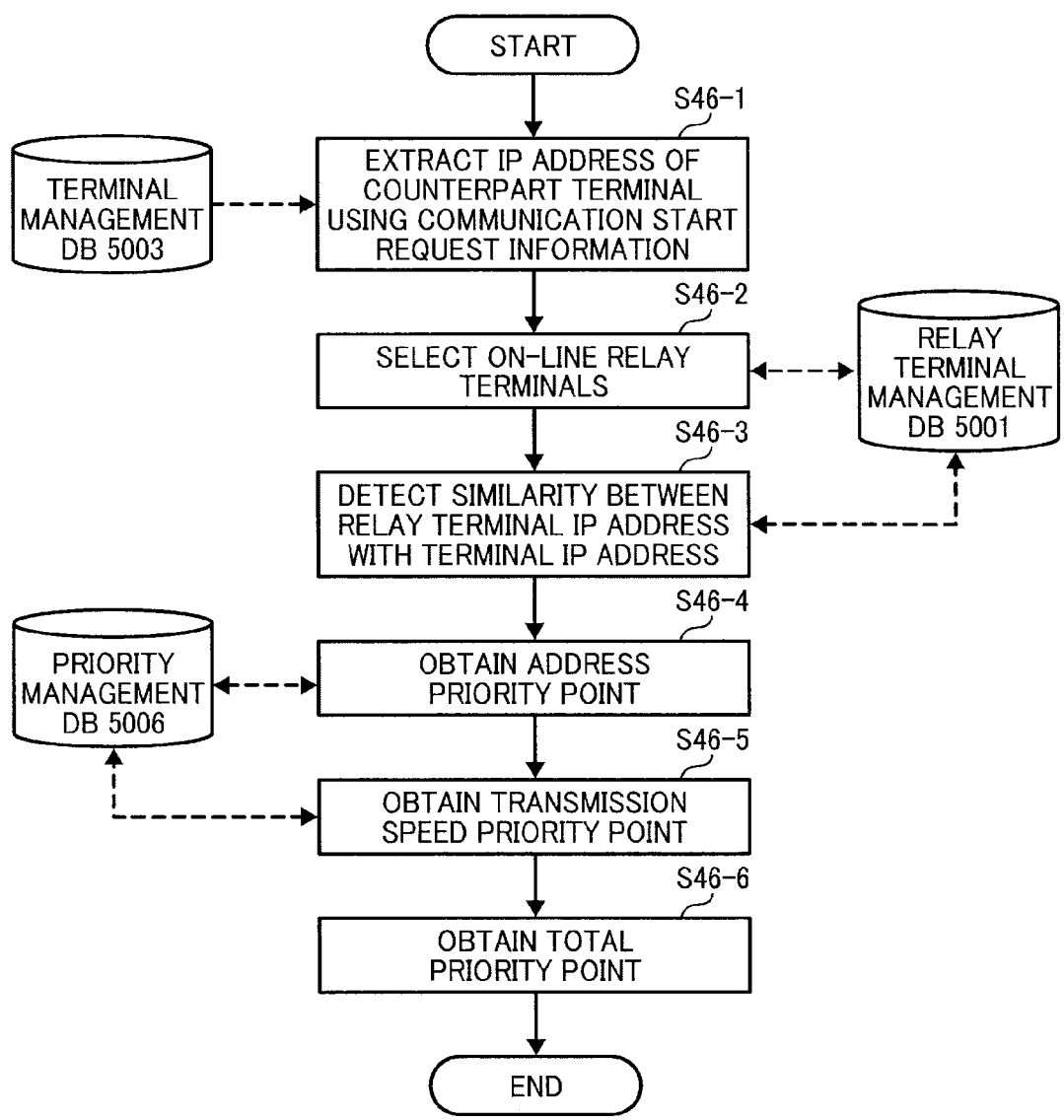
FIG. 22 is a flowchart illustrating operation of limiting a number of candidate relay terminals, performed by the management system of FIG. 7, according to an example embodiment of the present invention.
Figure 24A:
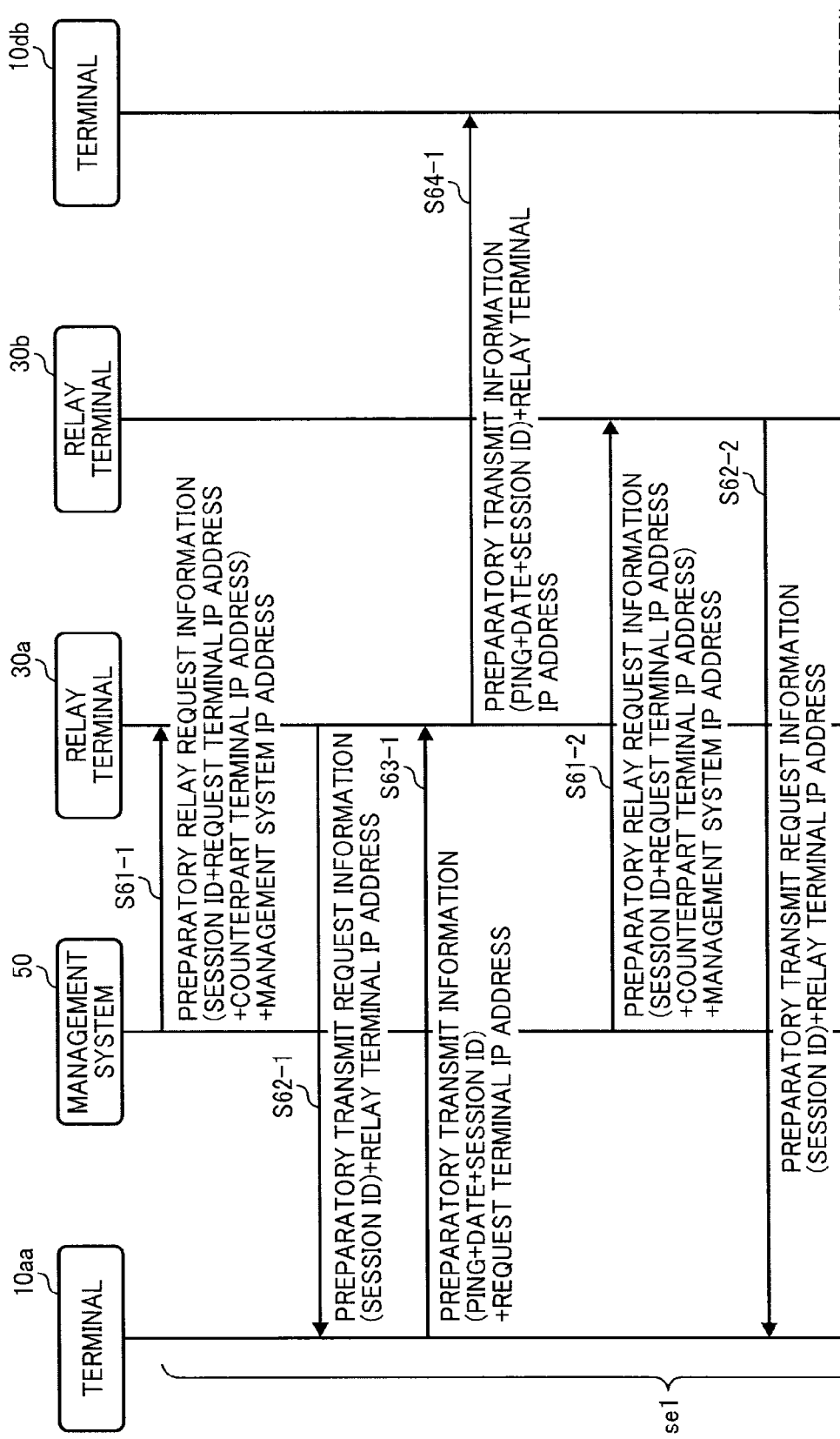
Figure 25:
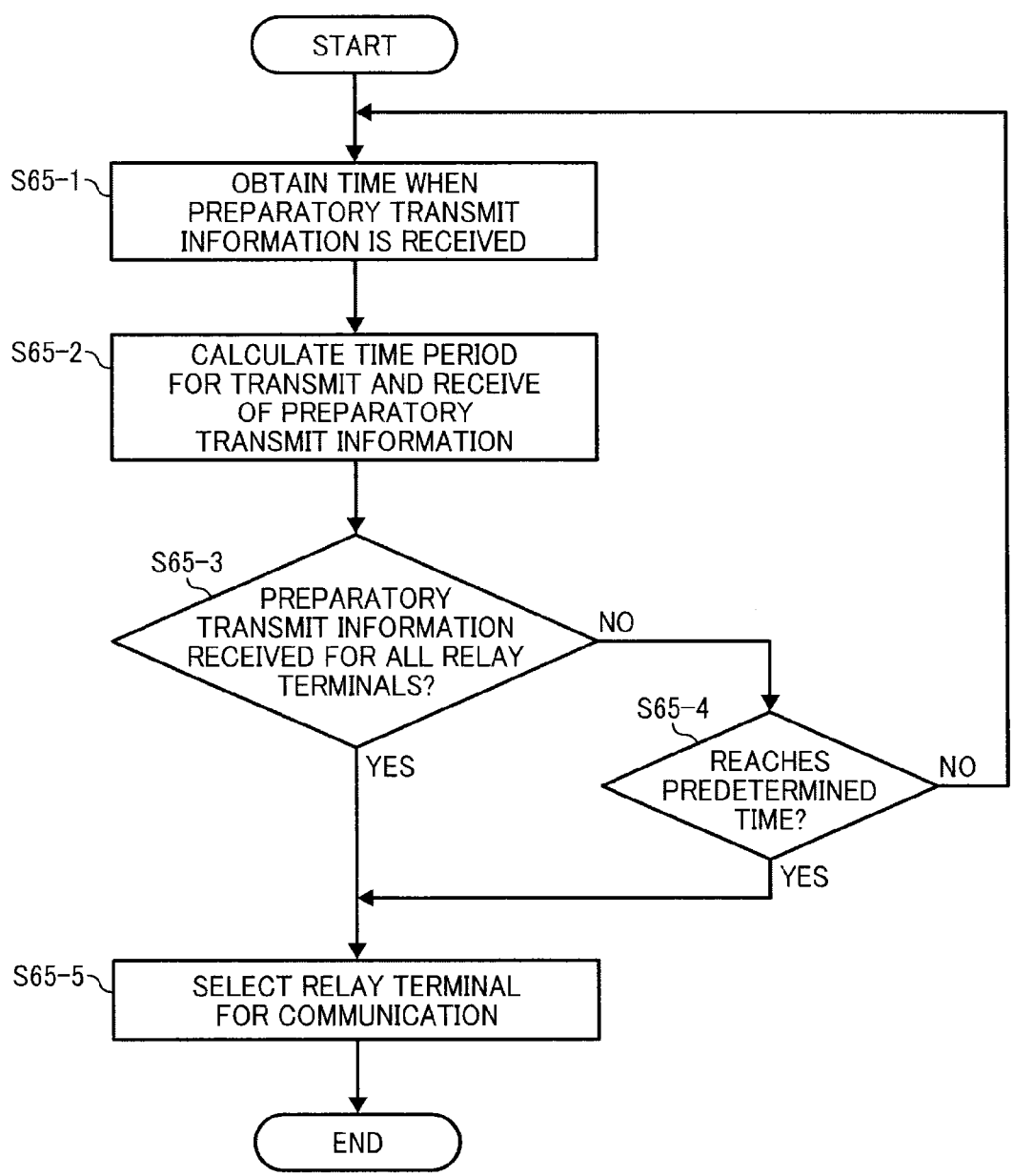
FIG. 25 is a flowchart illustrating operation of selecting a relay terminal, performed by the terminal of FIG. 7, according to an example embodiment of the present invention.
Figure 26:
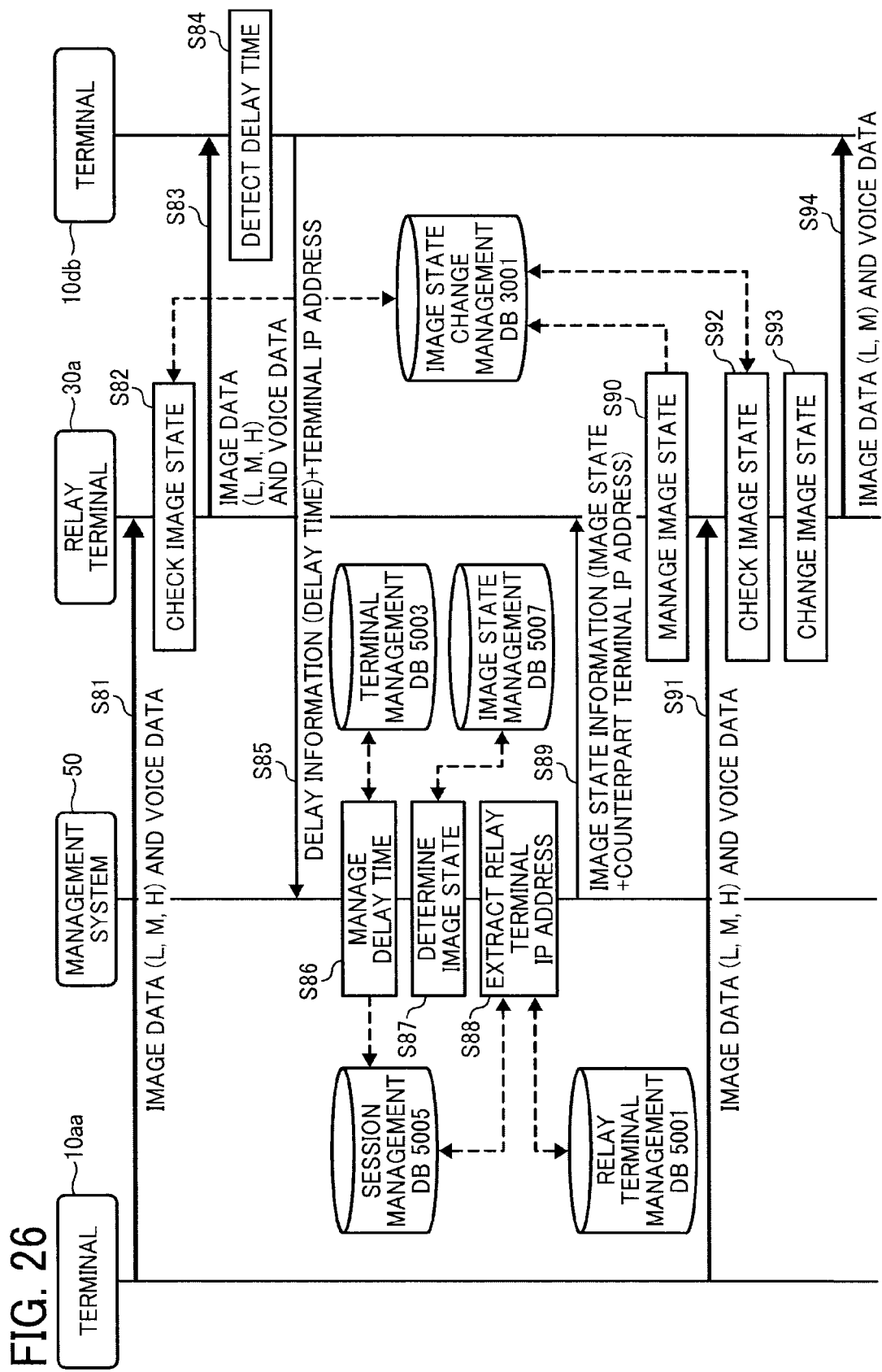
FIG. 26 is a data sequence diagram illustrating operation of transmitting or receiving data such as image data and sound data, performed by two or more terminals 10 of the transmission system of FIG. 1, according to an example embodiment of the present invention.

Referring now to FIGS. 19 to 26, example operation of the transmission system 1 of FIG. 1 is explained. FIG. 19 is a data sequence diagram illustrating operation of managing state information indicating an operation state of the relay terminal 30, which is transmitted from the relay terminal 30 to the management system 50. FIG. 20 is a data sequence diagram illustrating operation of establishing communication among two or more terminals 10 of the transmission system of FIG. 1. FIG. 21 is a data sequence diagram illustrating operation of limiting a number of candidate relay terminals. FIG. 22 is a flowchart illustrating operation of limiting a number of candidate relay terminals. FIG. 23 is a table storing a calculation result of a priority point, which is used for limiting a number of candidate relay terminals 30. FIGS. 24A and 24B are a data sequence diagram illustrating operation of selecting the relay terminal 30, performed by the transmission system 1. FIG. 25 is a flowchart illustrating operation of selecting the relay terminal 30 performed by the terminal 10. FIG. 26 is a data sequence diagram illustrating operation of transmitting or receiving data such as image data and sound data, performed by two or more terminals 10.

Referring now to FIG. 19, operation of managing state information of the relay terminal 30, which is sent from each relay terminal 30 to the management system 50, performed by the transmission system 1 is explained according to an example embodiment of the present invention. In this example, it is assumed that the relay terminals 30a, 30b, 30c, and 30d, which may be each or collectively referred to as the relay terminal 30, exist in the transmission system 1.

At S1-1, S1-2, S1-3, and S1-4, the relay terminals 30a, 30b, 30c, and 30d each periodically monitors the operation state of the relay terminal 30. This monitoring is performed by the state detector 32 (FIG. 7) of the relay terminal 30.

At S2-1, S2-2, S2-3, and S2-4, the data transmit/receive 31 of the relay terminal 30 periodically transmits state information of the relay terminal 30 to the management system 50 through the communication network 2. With the state information of the relay terminal 30 that is periodically received, the management system 50 is able to manage the operation state of the relay terminal 30 in realtime. The state information of the relay terminal 30 includes an operation state of the relay terminal 30 that is detected by the state detector 32 of the relay terminal 30, which is sent together with a relay terminal ID that uniquely identifies each relay terminal 30. For the descriptive purposes, in this example, it is assumed that the relay terminals 30a, 30b, and 30d each have the on-line state, and the relay terminal 30c has the off-line state due to the failure in relay control program of the relay terminal 30c.

At S3-1, S3-2, S3-3, and S3-4, the management system 50 receives the state information from the relay terminal 30 at the data transmit/receive 51, and stores the received state information of the relay terminal 30 in the memory 5000 through the memory control 59. More specifically, the memory control 59 stores the state information of each relay terminal 30 in association with the relay terminal ID of the corresponding relay terminal 30 in the relay terminal management DB 5001 (FIG. 11). For example, referring to FIG. 11, the management system 50 stores the state information of the relay terminal 30 indicating whether the relay terminal 30 is on-line, off-line, or in trouble, etc., in association with the relay terminal ID of the relay terminal 30. Additionally, the management system 50 stores the date and time information indicating the time when the management system 50 receives the state information of the relay terminal 30 in association with the relay terminal ID of the relay terminal 30. When the management system 50 does not receive any state information from the relay terminal 30, the relay terminal management table of FIG. 11 has an empty value for the "operation state" field and the "date and time" field for the subjected relay terminal 30. Alternatively, the value of the "operation state" field and the value of the "date and time" field may reflect the state information that is previously sent by the subjected relay terminal 30 to the management system 50 such that the relay terminal management table of FIG. 11 retains such value.

Referring now to FIG. 20, operation of transmitting and receiving various management data before starting videoconference with the terminal 10db by the request terminal 10aa is explained, according to an example embodiment of the present invention. In FIG. 20, management data is transmitted or received through the management data session sei.

For example, at S21, when the user selects "ON" using the power switch 109, the operation input 12 receives a user instruction for turning the power on, and causes the terminal 10 to turn on the power. At S22, as the power of the request terminal 10aa is turned on, the login request 13 of the request terminal 10aa automatically causes the data transmit/receive 11 to send the login request information that requests the login process to the management system 50 through the communication network 2. The login request information includes a terminal ID that identifies the request terminal 10aa, and a password assigned to the request terminal 10aa. The terminal ID and the password may be obtained by the memory control 19 from the memory 1000, and sent to the data transmit/receive 11. At the time of sending the login request information from the request terminal 10aa to the management system 50, the request terminal 10aa sends an IP address of the request terminal 10aa such that the management system 50 knows the IP address of the request terminal 10aa.

At S23, the terminal authenticator 52 of the management system 50 searches the terminal authentication management DB 5002 (FIG. 12) stored in the memory 5000 using the terminal ID and the password of the login request information received through the data transmit/receive 51. When it is determined that the terminal ID and the password of the login request information is stored in the terminal authentication management DB 5002, the terminal authenticator 52 determines that the terminal 10aa is authenticated.

At S24, when the terminal authenticator 52 authenticates that the login request information is received from the authenticated terminal 10, the state manager 53 of the management system 50 stores the operation state, the date and time at which the login request information is received, and the IP address of the terminal 10aa, with respect to the terminal ID in the terminal management DB 5003 (FIG. 13) to create a record of the terminal 10aa. Using the terminal management table of FIG. 13, which stores the operations state of "online, communication OK", the date and time of "13:40, Nov. 10, 2009", and the terminal IP address of "1.2.1.3" in association with the terminal ID "01aa", various information regarding the terminal 10aa can be managed.

At S25, the data transmit/receive 51 of the management system 50 sends the authentication result obtained by the terminal authenticator 52 to the request terminal 10aa that has sent the login request information through the communication network 2. As described above, in this example, it is assumed that the terminal authenticator 52 determines that the terminal 10aa is an authenticated terminal.

At S26, the terminal extractor 54 of the management system 50 searches the candidate list management DB 5004 (FIG. 14) using the terminal ID "01aa" of the request terminal 10aa that has sent the login request information to extract a terminal ID and a terminal name for each of candidate terminals 10 that are previously registered for the request terminal 10aa. More specifically, referring to FIG. 14, the terminal extractor 54 extracts terminal IDs including "01ab", "01ba", "01db", etc. of terminals 10ab, 10ba, 10db, etc., which are associated with the request terminal 10aa.

Further, at S27, the terminal state obtainer 55 searches the terminal management DB 5003 (FIG. 13) using the extracted terminal IDs ("01ab", "01ba", and "01db", etc.) of the candidate terminals 10 extracted by the extractor 54 as a search key to obtain the operation state for each one of the candidate terminals 10ab, 10ba, 10db, etc.

At S28, the data transmit/receive 51 of the management system 50 sends the terminal ID ("01ab", "01ba", and "01db", etc.) and the operation state information for each one of the candidate terminals 10ab, 10ba, 10db, etc. to the request terminal 10aa through the communication network 2. More specifically, the data transmit/receive 51 of the management system 50 sends the operation state information of the candidate terminal 10ab together with the terminal ID "01ab" of the candidate terminal 10ab as the terminal state information. In this example, the terminal ID "01ab" of the candidate terminal 10ab has been extracted by the terminal extractor 54. Using the terminal ID "01ab" as a search key, the operation state of the candidate terminal 10ab, which is the off-line state, is obtained. Similarly, the data transmit/receive 51 of the management system 50 sends the terminal state information of the candidate terminal 10ba, which includes the terminal ID "01ba" and the operation state of the candidate terminal 10ba indicating the "online, interrupted" state. This process of sending the terminal state information is repeated until the terminal state information is sent for all of the candidate terminals 10. In this manner, the request terminal 10aa is able to obtain the operation states ("offline", "online", and "online", etc.) of the candidate terminals 10ab, 10ba, and 10db, etc.

At S29, the terminal extractor 54 of the management system 50 searches the candidate list management DB 5004 (FIG. 14) using the terminal ID "01aa" of the request terminal 10aa that has sent the login request information to extract the terminal ID of one or more terminals 10 each of which registers the request terminal 10aa as one of its candidate terminals 10. The candidate list management table of FIG. 14 indicates that the terminal ID of the terminal 10 having the request terminal 10aa as a candidate terminal is "01ab", "01ba", and "01db".

At S30, the terminal state manager 55 of the management system 50 searches the terminal management DB 5003 (FIG. 13) using the terminal ID "01aa" of the request terminal 10aa that has sent the login request information as a search key to obtain the operation state of the request terminal 10aa. In this example, the operation state "online, communication OK" is extracted for the request terminal 10aa.

At S31-1 and S31-2, the data transmit/receive 51 of the management system 50 sends the terminal ID "01aa" and the operation state of the request terminal 10aa, which are respectively obtained at S30, to the terminals 10ab, 10ba, and 10db each having the request terminal 10aa as a candidate terminal that is obtained at S29. In this example, the management system 50 sends the terminal state information of the request terminal 10aa to only the terminals 10ba and 10db each having the "online, communication OK" state as shown in FIG. 13. Further, since the operation state for the request terminal 10aa is "online, communication OK", the operation state information "online, communication OK" is transmitted.

More specifically, in this example, the data transmit/receive 51 refers to the terminal management table of FIG. 13 to obtain the IP address of each of the terminals 10ba and 10db. Using the obtained IP addresses, the management system 50 is able to send the terminal state information of the request terminal 10aa to the terminals 10ba and 10db each of which lists the request terminal 10aa as a candidate terminal.

The above-described operation of S22 to S31-1 and 31-2 is performed by any desired terminal 10 as the power of the terminal 10 is turned on through the power switch 109 (FIG. 6).

Referring now to FIG. 21, operation of limiting a number of candidate relay terminals 30 is explained according to an example embodiment of the present invention. The operation of FIG. 21 is performed during a management data session sei (FIG. 2), which transmits or receives various management data in the transmission system 1. Further, in this example, the request terminal 10aa can start communication with at least one of the terminals 10ba, 10db, etc., based on the terminal state information received at S28 of FIG. 20. For the descriptive purposes, it is assumed that the user at the request terminal 10aa starts communication with the counterpart terminal 10db.

At S41, the user at the request terminal 10aa operates the operation button 108 to select the terminal 10db as a counterpart terminal. Upon selection, the operation input 12 (FIG. 7) of the request terminal 10aa receives a user instruction for starting communication with the counterpart terminal 10db.

At S42, the data transmit/receive 11 of the request terminal 10aa sends the communication start request information that requests the management system 50 to start communication with the counterpart terminal 10db to the management system 50. The communication start request information at least includes identification information such as the terminal ID "01aa" of the request terminal 10aa and the terminal ID "01db" of the counterpart terminal 10db. With the communication start request information, the data transmit/receive 51 of the management system 50 receives the IP address "1.2.1.3" of the request terminal 10aa.

At S43, the state manager 53 looks for records in the terminal management DB 5003 (FIG. 13) based on the terminal ID "01aa" of the request terminal 10aa and the terminal ID "01db" of the counterpart terminal 10db, which are included in the communication start request information. The state manager 53 changes each of the operation states of the request terminal 10aa and the counterpart terminal 10db in the records, from the online, communication OK state to the online, communicating state.

At this time, the request terminal 10aa and the counterpart terminal 10db have not started communication, but the request terminal 10aa and the counterpart terminal 10db each have the communicating state. In case another terminal 10 tries to communicate with the request terminal 10aa or the counterpart terminal 10db, the management system 50 causes the another terminal 10 to output voice or display indicating that the request terminal 10aa or the counterpart terminal 10db is in the communicating state.

At S44, the management system 50 prepares for a session that is performed for selecting the relay terminal 30 for communication between the request terminal 10aa and the counterpart terminal 10db. More specifically, at S44, the session ID generator 56a (FIG. 9) of the management system 50 generates a session ID for a session that is to be performed for selection of the relay terminal 30.

At S45, the session manager 57 stores the session ID "se1" generated at S44, the terminal ID "01aa" of the request terminal 10aa, and the terminal ID "01db" of the counterpart terminal 10db, in the session management DB 5005 (FIG. 15) stored in the memory 5000.

At S46, the primary relay terminal selection unit 56 of the management system 50 limits a number of candidate relay terminals 30 from which one relay terminal 30 to be used for communication between the request terminal 10aa and the counterpart terminal 10db is selected, using the relay terminal management DB 5001, the terminal management DB 5003, and the priority management DB 5006.

Referring now to FIG. 9 and FIG. 22, operation performed at S46 of FIG. 21 is explained in detail. At S46-1 of FIG. 22, the terminal IP address extractor 56b of the management system 50 searches the terminal management DB 5003 (FIG. 13) using the terminal ID "01aa" of the request terminal 10aa and the terminal ID "01db" of the counterpart terminal 10db included in the communication start request information sent from the request terminal 10aa as a key to obtain the IP addresses of the terminals 10aa and 10db, i.e., the IP address "1.2.1.3" and the IP address "1.3.2.4".

At S46-2, the primary selector 56c refers to the relay terminal management DB 5001 (FIG. 11) to select one or more relay terminals 30 having the on-line operation state, and obtains the relay terminal ID of the selected relay terminal 30. More specifically, in this example, the primary selector 56c obtains the relay terminal IDs 111a, 111b, and 111d of the relay terminals 30a, 30b, and 30d.

At S46-3, the primary selector 56c searches the relay terminal management DB 5001 (FIG. 11) to obtain the IP address of each of the relay terminals 30a, 30b, and 30d, using the relay terminal IDs 111a, 111b, and 111d obtained at S46-2. Further, the primary selector 56c compares each one of the IP addresses "1.2.1.2", "1.2.2.2", and "1.3.2.2" of the relay terminals 30a, 30b, and 30d, with each one of the IP addresses "1.2.1.3" and "1.3.2.4" obtained at S46-1, dot address by dot address, to determine the degree of similarity between the relay terminal IP address and the terminal IP address.

At S46-4, the priority determiner 56d refers to the priority management DB 5006 (FIG. 16) to determine a value of address priority point for each one of the relay terminals 30a, 30b, and 30d. In this example, as illustrated in FIG. 23, for each one of the relay terminals 30a, 30b, and 30d, the priority determiner 56d obtains an address priority point with respect to the request terminal 10aa and an address priority point with respect to the counterpart terminal 10db. FIG. 23 illustrates a table storing a calculation result of a priority point, which is used for limiting a number of candidate relay terminals 30. The table of FIG. 23 stores an address priority point, a transmission speed priority point, and a total priority point, for each one of the relay terminals IDs of the relay terminals 30. The address priority point includes a first address priority point with respect to the request terminal 10aa, and a second address priority point with respect to the counterpart terminal 10db. The total priority point is obtained by adding the highest one of the first and second address priority points with the transmission speed priority point.

In this example, based on comparison between the IP address "1.2.1.2" of the relay terminal 30a and the IP address "1.2.1.3" of the request terminal 10aa, the degree of similarity is "S.S.S.D" such that the address priority point of 5 is obtained. Similarly, based on comparison between the IP address "1.2.1.2" of the relay terminal 30a and the IP address "1.3.2.4" of the counterpart terminal 10db, the degree of similarity is "S.D.D.D" such that the address priority point of 1 is obtained. Based on comparison between the IP address "1.2.2.2" of the relay terminal 30b and the IP address "1.2.1.3" of the request terminal 10aa, the degree of similarity is "S.S.D.D" such that the address priority point of 3 is obtained. Similarly, based on comparison between the IP address "1.2.2.2" of the relay terminal 30b and the IP address "1.3.2.4" of the counterpart terminal 10db, the degree of similarity is "S.D.S.D" such that the address priority point of 1 is obtained. Based on comparison between the IP address "1.3.2.2" of the relay terminal 30d and the IP address "1.2.1.3" of the request terminal 10aa, the degree of similarity is "S.D.D.D" such that the address priority point of 1 is obtained. Similarly, based on comparison between the IP address "1.3.2.2" of the relay terminal 30a and the IP address "1.3.2.4" of the counterpart terminal 10db, the degree of similarity is "S.S.S.D" such that the address priority point of 5 is obtained.

Referring back to FIG. 22, at S46-5, the priority determiner 56d searches the priority management DB 5006 (FIG. 17) using the maximum data transmission speed of the relay terminal 30 that is stored in the relay terminal management DB 5001 (FIG. 11) to determine a transmission priority point for each one of the relay terminals 30a, 30b, and 30d that are selected at S46-2.

In this example, referring to FIG. 11 and FIG. 17, the relay terminal 30a having the maximum data transmission speed of 100 Mbps is assigned with the transmission priority point of 3. Similarly, the relay terminal 30b having the maximum data transmission speed of 1000 Mbps is assigned with the transmission priority point of 5. Similarly, the relay terminal 30d having the maximum data transmission speed of 10 Mbps is assigned with the transmission priority point of 1. Accordingly, the priority determiner 56d stores the transmission priority point for each one of the relay terminals 30a, 30b, and 30d in the table of FIG. 23.

At S46-6, for each one of the relay terminals 30a, 30b, and 30d, the primary selector 56c adds the highest one of the first and second address priority points with the transmission speed priority point to obtain a total priority point. The primary selector 56c selects the total of two relay terminals 30 having the highest priority point. For example, the primary selector 56c selects the relay terminal 30 having the highest total priority point and the relay terminal 30 having the second highest total priority point as a candidate relay terminal 30 for further processing. In this example, referring to FIG. 23, the relay terminals 30a, 30b, and 30d having the relay terminal IDs 111a, 111b, and 111d respectively have the total priority points of 8, 8, and 6. Accordingly, the primary selector 56c selects the relay terminal 30a having the relay terminal ID 111a, and the relay terminal 30b having the relay terminal ID 111b.

After the operation of S46 illustrated in FIG. 21 completes, at S47 of FIG. 21, the data transmit/receive 51 (FIG. 7) of the management system 50 sends the relay terminal selection information to the counterpart terminal 10db through the communication network 2. The relay terminal selection information includes a number of candidate relay terminals 30, which is "2", the terminal ID "01aa" of the request terminal 10aa, and the session ID "se1" for relay terminal selection. With this relay terminal selection information, the counterpart terminal 10db is able to obtain information including the number of candidate relay terminals 30, the request terminal 10aa that requests for videoconference, and the session ID "se1" of the session for relay terminal selection. In addition, the counterpart terminal 10db obtains the IP address "1.1.1.2" of the management system 50 that has sent the relay terminal selection information.

At S48, the data transmit/receive 11 of the counterpart terminal 10db sends confirmation information indicating that the relay terminal selection information is received, to the management system 50 through the communication network 2, with the IP address of the counterpart terminal 10db. The confirmation information includes the session ID "se1". With this confirmation information, the management system 50 is able to know that the counterpart terminal 10db is notified with the number of candidate relay terminals 30 obtained during the session se1, and the IP address "1.3.2.4" of the counterpart terminal 10db.

Referring now to FIGS. 24A, 24B (FIG. 24), and 25, operation of selecting the relay terminal 30, performed by the counterpart terminal 10db, is explained according to an example embodiment of the present invention. The operation of FIG. 24 is performed during the management data session sei of FIG. 2, which transmits or receives various management data in the transmission system 1.

Before starting videoconference, at S61-1 and S61-2, the management system 50 sends preparatory relay request information, respectively, to the relay terminals 30a and 30b, which are selected by the management system 50 at S46 as candidate relay terminals. The preparatory relay request information requests the relay terminal 30 to perform relay processing before starting the videoconference. More specifically, the preparatory relay request information includes the session ID "se1", the IP address "1.2.1.3" of the request terminal 10aa, and the IP address "1.3.2.4" of the counterpart terminal 10db, and is transmitted with the IP address of the management system 50. With this preparatory relay request information, the relay terminals 30a and 30b are each able to obtain information including the session, the request terminal, the counterpart terminal, and the IP address "1.1.1.2" of the management system 50 that has sent the preparatory relay request information.

At S62-1 and S62-2, the relay terminals 30a and 30b each cause the data transmit/receive 31 to send preparatory transmit request information to the request terminal 10aa through the communication network 2. The preparatory transmit request information requests the request terminal 10aa to send preparatory transmit information including the Packet Internet Grouper (PING) to each one of the relay terminals 30a and 30b before starting the videoconference. More specifically, the preparatory transmit request information includes the session ID "se1", and is transmitted with the IP addresses of the relay terminals 30a and 30b. With this preparatory transmit request information, the request terminal 10aa is able to know that the preparatory transmit information is to be sent during the session with the session ID "se1", as well as the IP addresses "1.2.1.2" and "1.2.2.2" of the relay terminals 30a and 30b.

As described above, the management system 50 does not directly send the IP address of the counterpart terminal 10db to the request terminal 10aa. Instead, as described above referring to S61-1 and S61-2, the management system 50 sends the IP address of the counterpart terminal 10db respectively to the relay terminal 30a and the relay terminal 30b. As described above referring to S62-1, the relay terminal 30aa requests the request terminal 10aa to send the preparatory transmit information to the relay terminal 30aa. In this manner, the management system 50 prevents the terminal 10 from obtaining the IP address of another terminal 10, thus improving the security.

At S63-1 and S63-2, the request terminal 10aa causes the data transmit/receive 11 to send the preparatory transmit information, respectively, to the relay terminals 30a and 30b through the communication network 2. The preparatory transmit information is sent to the counterpart terminal 10db through each one of the relay terminals 30a and 30b before the contents data such as the image data and the sound data is transmitted. By sending the preparatory transmit information in replace of the contents data, the management system 50 is able to calculate a time period required for transmitting the contents data from the request terminal 10aa to the counterpart terminal 10db through each one of the relay terminals 30a and 30b. Further, the preparatory transmit information includes PING information used for checking whether the request terminal 10aa, the relay terminal 30a or 30b, and the counterpart terminal 10db are each connected to allow communication, the date and time of which the request terminal 10aa sends the preparatory transmit information, and the session ID "se1". With this preparatory transmit information, each of the relay terminals 30a and 30b knows that the preparatory transmit information is transmitted in the session with the session ID "se1", and the IP address "1.2.1.3" of the request terminal 10aa that has sent the preparatory transmit information.

At S64-1 and S64-2, the relay terminals 30a and 30b each transmit the preparatory transmit information to the counterpart terminal 10db having the IP address "1.3.2.4", which is obtained from the preparatory transmit information. With the preparatory transmit information, the counterpart terminal 10db is able to know that the preparatory transmit information is transmitted during the session with the session ID "se1", and the IP addresses "1.2.1.2" and "1.2.2.2" of the relay terminals 30a and 30b that respectively send the preparatory transmit information.

At S65, the secondary relay terminal selection unit 16 of the counterpart terminal 10db selects one of the relay terminals 30a and 30b to be used for videoconference, based on the preparatory transmit information.

Referring now to FIG. 8 and FIG. 25, operation of selecting the relay terminal 30 for videoconference, which is performed at S65 of FIG. 24, is explained. At S65-1, the counter 16a of the secondary relay terminal selection unit 16 (FIG. 8) obtains the date and time at which the data transmit/receive 11 of the counterpart terminal 10db receives the preparatory transmit information for each one of the relay terminals 30a and 30b.

At S65-2, the calculator 16b calculates, for each one of the relay terminals 30a and 30b, a time period between the time when the preparatory transmit information is transmitted by the request terminal 10aa and the time when the preparatory transmit information is received by the counterpart terminal 10db. The date and time at which the preparatory information is transmitted by the request terminal 10aa is obtainable from the preparatory transmit information. The date and time of which the preparatory transmit information is received at the counterpart terminal 10db is obtained by the counter 16a.

At S65-3, the secondary selector 16c determines whether all items of preparatory transmit information is received for all of candidate relay terminals, during the session with the session ID "se1". In this example, the secondary selector 16c counts a total number of items of preparatory transmit information that have been received, and compares with the total number of candidate relay terminals 30 of "2".

When it is determined that the preparatory transmit information has not been received for at least one relay terminal 30 ("NO" at S65-3), the operation proceeds to S65-4. When it is determined that the preparatory transmit information has been received for all of the candidate relay terminals 30 ("YES" at S65-3), the operation proceeds to S65-5. When it is determined that the predetermined time period has not passed ("NO" at S65-4), the operation returns to S65-1. When it is determined that the predetermined time period has passed ("YES" at S65-4), the operation proceeds to S65-5.

At S65-4, the secondary selector 16c determines whether a predetermined time period passes after the preparatory transmit information is received at the counterpart terminal 10db. In this example, the predetermined time period is set to one minute. When it is determined that the predetermined time period has not passed ("NO" at S65-4), the operation returns to S65-1. When it is determined that the predetermined time period has passed ("YES" at S65-4), the operation proceeds to S65-5. At S65-5, the secondary selector 16c selects one of the relay terminals 30, which has the least value of the time period required for transmitting the preparatory transmit information based on the calculation of the calculator 16b.

In this example, it is assumed that the relay terminal 30a is selected as a time period for transmitting the preparatory transmit information that is relayed through the relay terminal 30a has a value less than the value of the time period for transmitting the preparatory transmit information that is relayed through the relay terminal 30b.

Referring back to FIG. 24, at S66, the data transmit/receive 11 of the counterpart terminal 10db sends the relay terminal selection information to the management system 50 through the communication network 2. In this example, the relay terminal selection information indicates that the relay terminal 30a is selected. More specifically, the relay terminal selection information includes the session ID "se1", and the relay terminal ID "111a" of the selected relay terminal 30a, and is transmitted with the terminal IP address of the counterpart terminal 10db. With the relay terminal selection information, the management system 50 is able to know that the relay terminal 30a has been selected during the session with the session ID "se1", and the IP address "1.3.2.4" of the counterpart terminal 10db that has sent the relay terminal selection information.

At S67, the session manager 57 of the management system 50 stores, in the session management table of FIG. 15 stored in the session management DB 5005, the relay terminal ID "111a" of the relay terminal 30a, which is finally selected for communication, in the "relay terminal ID" field of a record provided for the session with the session ID "se1".

At S68, the data transmit/receive 51 of the management system 50 sends the relay start request information to the relay terminal 30a through the communication network 2. The relay start request information requests the relay terminal 30a to start relay operation. More specifically, the relay start request information includes the IP address "1.2.1.3" of the request terminal 10aa, and the IP address "1.3.2.4" of the counterpart terminal 10db.

At S69, the relay terminal 30a establishes four sessions between the request terminal 10aa and the counterpart terminal 10db including a session for transmission of low-level resolution image data, a session for transmission of medium-level resolution image data, a session for transmission of high-level resolution image data, and a session for transmission of sound data. Once these sessions are established, the request terminal 10aa is able to start videoconference with the counterpart terminal 10db.

In the above-described example, the management system 50 sends the relay terminal selection information to the counterpart terminal 10db at S47 (FIG. 21), and the counterpart terminal 10db performs operation of S48, S64-1 (FIG. 24), S64-2 (FIG. 24), and S65 (FIG. 24) to select the relay terminal 30. In alternative to this example, the management system 50 may send the relay terminal selection information to the request terminal 10aa to cause the request terminal 10aa to perform selection of the relay terminal 30. In such case, the request terminal 10aa performs operation of S48, S64-1, S64-2, and S65 in a substantially similar manner as described above. Further, at S66, the request terminal 10aa sends the relay terminal selection information to the management system 50.

Referring now to FIG. 7 and FIG. 26, operation of transmitting and receiving contents data such as image data and sound data between the request terminal and the counterpart terminal to carry out videoconference, performed by the transmission system 1, is explained according to an example embodiment of the present invention.

In this example, the contents data such as the image data and the sound data flows in a direction from the request terminal 10aa to the counterpart terminal 10db, or in another direction from the counterpart terminal 10db to the request terminal 10aa. Since operation such as transmission and reception of the contents data or detection of delay time is the same for both of the directions, the following example focuses on communication in which data flows from the request terminal 10aa to the counterpart terminal 10db.

Referring to FIG. 26, at S81, the data transmit/receive 11 of the request terminal 10aa sends the contents data to the relay terminal 30a through the communication network 2 in the contents data session "sed". The contents data includes image data such as image data of an object captured by the imaging unit 14a and sound data that is input through the sound input 15a. In this example, it is assumed that the high-quality image data based on the low-level resolution image data, the medium-level resolution image data, and the high-level resolution image data, and the sound data, are transmitted.

Accordingly, the data transmit/receive 31 of the relay terminal 30a receives the image data of three different resolution levels, and the sound data.

At S82, the image state checker 33 searches the image state change management DB 3001 (FIG. 10) using the IP address "1.3.2.4" of the counterpart terminal 10db as a key to obtain the image state information, and to determine whether to change quality of image data to be transmitted to the relay terminal 30a or interrupt transmission of image data.

In this example, the quality of image data to be transmitted to the relay terminal 30a is the high-quality image data. Since the image data that is received at the data transmit/receive 31 has the quality that is the same as the quality of the image data obtained from the image state change management DB 3001, at S83, the relay terminal 30a sends the high-quality image data and the sound data to the counterpart terminal 10db in the contents data session "sed", without applying further image processing.

The counterpart terminal 10db receives the high quality image data that is generated based on the low-level resolution image data, medium-level resolution image data, and high-level resolution image data, and the sound data, at the data transmit/receive 11. The display control 14b combines the image data of three different resolution levels into the high quality image data for display onto the display 120. Further, the sound output 15b outputs the sound based on the sound data.

At S84, the delay detector 18 of the counterpart terminal 10db periodically detects a delay time indicating the time at which the image data is received at the data transmit/receive 11, for example, every one second. In this example, it is assumed that the delay time of 200 ms is obtained.

At S85, the data transmit/receive 11 of the counterpart terminal 10db sends the delay information indicating the delay time of 200 ms to the management system 50 through the communication network 2, during the management data session "sei". With the delay information, the management system 50 is notified of the delay time, and the IP address "1.3.2.4" of the counterpart terminal 10db that has sent the delay information.

At S86, the delay time manager 60 of the management system 50 searches the terminal management DB 5003 (FIG. 13) using the IP address "1.3.2.4" of the counterpart terminal 10db as a search key to extract the terminal ID "01db" of the counterpart terminal 10db. The delay time manager 60 stores the delay time of 200 ms obtained from the delay information in a "delay time" field of the record of the terminal ID "01db" of the session management table stored in the session management DB 5005 (FIG. 15).

At S87, the image state determiner 58 searches the image state management DB 5007 (FIG. 18) using the delay time of 200 ms to extract the image state information, that is, the image data quality of "MEDIUM". Based on the extracted image data quality, the image state determiner 58 determines that the quality of image data suitable for the delay time of 200 ms is medium.

At S88, the data transmit/receive 51 searches the relay terminal management DB 5001 (FIG. 11) using the relay terminal ID "111a", which is stored in the session management DB (FIG. 15) in association with the counterpart terminal ID "01db", to extract the IP address "1.2.1.2" of the relay terminal 30a.

At S89, the data transmit/receive 51 sends the image state information such as the quality information indicating that the image data quality that has been determined at S87 is medium-level, to the relay terminal 30a through the communication network 2 during the management data session "sei".

The image state information is transmitted with the IP address "1.3.2.4" of the counterpart terminal 10*db*, which was used as a search key at S86.

At S90, the data quality manager 34 of the relay terminal 30*a* stores the IP address "1.3.2.4" of the counterpart terminal 10*db* in association with the "medium-level" quality image data to be relayed by the counterpart terminal 10*db*, in the image state change management DB 3001 (FIG. 10).

At S91, the request terminal 10*aa* transmits the high quality image data including the low-level resolution image data, the medium-level resolution image data, and the high-level resolution image data, and the sound data, to the relay terminal 30*a* during the contents data session "sed", in a substantially similar manner as described above referring to S81.

At S92, the image state checker 33 of the relay terminal 30*a* searches the image state change management DB 3001 (FIG. 10) using the IP address "1.3.2.4" of the counterpart terminal 10*db* as a search key to determine whether to extract the quality of the image data suitable for the counterpart terminal 10*db* or to interrupt transmission of image data, in a substantially similar manner as described above referring to S82.

At S93, since the image data quality that is stored for the counterpart terminal 10*db* is the medium-level, which is lower than the quality of the image data that is received at the data transmit/receive 31, the image state changer 35 changes the quality of the image data from the high-level to the medium level. In this example, the quality of the sound data remains the same.

At S94, the data transmit/receive 31 of the relay terminal 30 sends the image data having the quality that is lowered to the medium-level, and the sound data, to the counterpart terminal 10*db* through the communication network 2, during the contents data session "sed". The data transmit/receive 11 of the counterpart terminal 10*db* receives the medium-quality image data that is generated based on the low-level resolution image data and the medium-level resolution image data, and the sound data. The display control 14*b* of the counterpart terminal 10*db* combines the image data of two different resolution levels to generate the medium-level image data for display on the display 120. Further, the voice output 15*b* outputs the voice sound generated based on the sound data.

As described above, when any delay in receiving the image data at the counterpart terminal 10*db* is observed, the relay terminal 30*a* changes the quality of image data by lowering the quality of image data. Accordingly, the users participating the videoconference are able to carry out communication more smoothly.

In the above-described example, it is assumed that the delay time of 200 ms is obtained, which indicates that delay in the time at which the image data is received at the counterpart terminal 10*db*. In such case, the quality of image data to be transmitted is made lower, thus increasing the transmission speeds. If the delay time having much longer time is obtained, however, the management system 50 interrupts transmission of image data such that the terminal 10 does not receive image data. In such case, the management system 50 generates a message indicating that image data is not transmitted to notify the user at the terminal 10. Alternatively, the management system 50 may generate a message indicating that only sound data is transmitted to notify the user at the terminal 10.

More specifically, at S85, it is assumed that the delay time of 600 ms is obtained from the counterpart terminal 10*db*. At S86, the delay time manager 60 of the management system 50 stores the delay time of 600 ms that is obtained from the delay information in the "delay time" field of the record of the terminal ID "01db" of the session management table stored in the session management DB 5005 (FIG. 15).

At S87, the image state determiner 58 searches the image state management DB 5007 (FIG. 18) using the delay time of 600 ms as a search key to extract the image state information, that is, "INTERRUPT". Based on the extracted image state information, the image state determiner 58 determines that transmission of image data by the relay terminal 30*a* is interrupted.

Accordingly, at S94, the data transmit/receive 31 of the relay terminal 30 only sends the sound data to the counterpart terminal 10*db* through the communication network 2, during the contents data session "sed".

Figure 27:
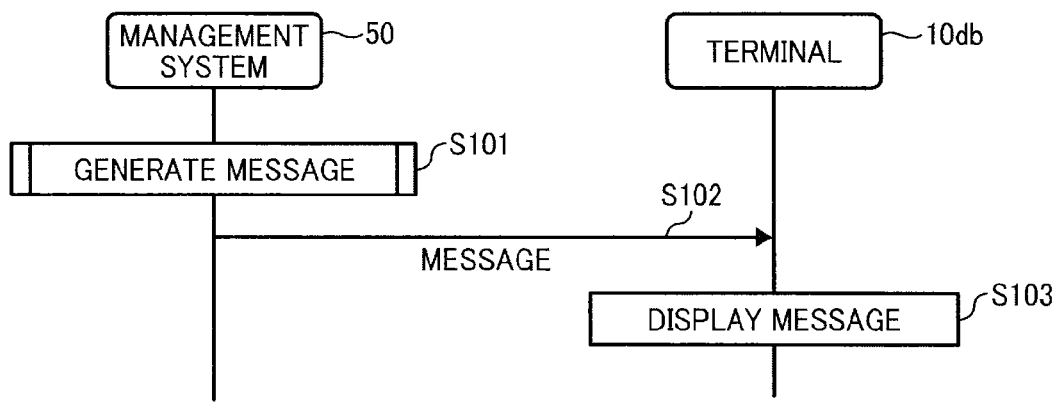
FIG. 27 is a data sequence diagram illustrating operation of generating, transmitting, and displaying a message, performed by the transmission system of FIG. 1 according to an example embodiment of the present invention.
Figure 28:
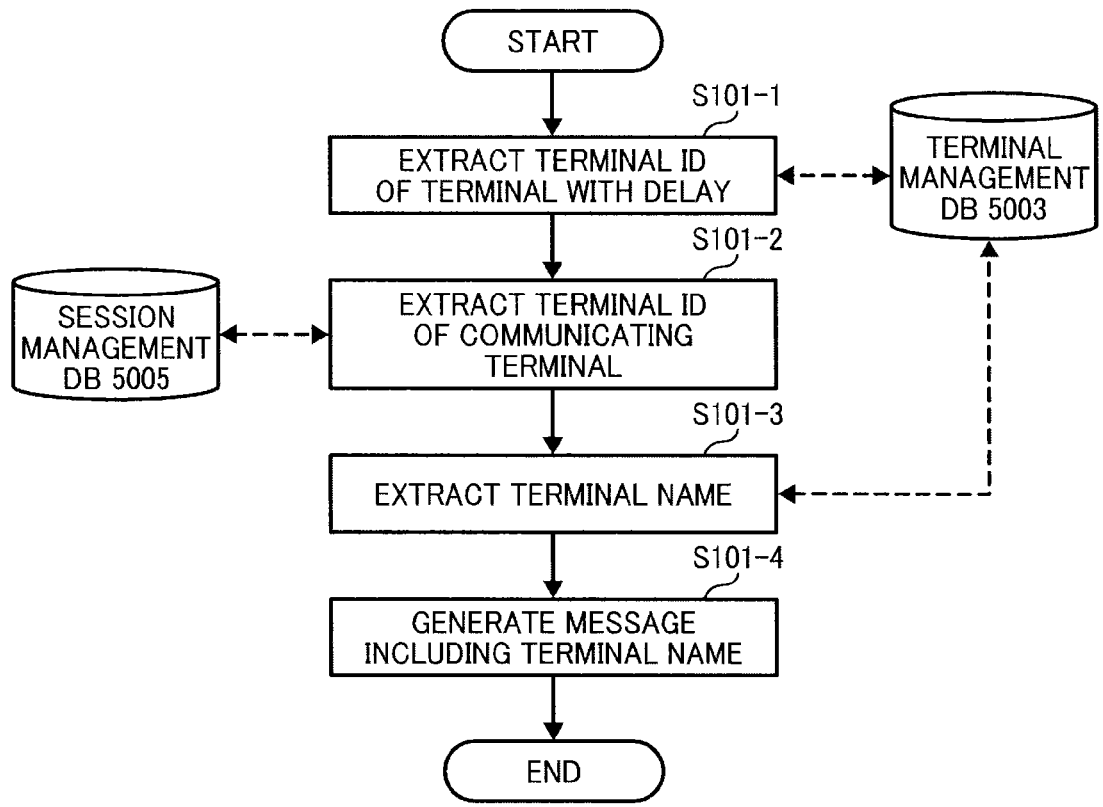
FIG. 28 is a flowchart illustrating operation of generating a message, performed by the management system of FIG. 1, according to an example embodiment of the present invention.

When the image state information indicates "INTERRUPT" at S87, in concurrently with S88 and S89, the management system 50 further performs operation of generating a message as illustrated in FIGS. 27 and 28. FIG. 27 illustrates a data sequence diagram illustrating operation of generating and displaying a message, performed by the transmission system of FIG. 1, according to an example embodiment of the present invention. FIG. 28 is a flowchart illustrating operation of generating a message, performed by the management system 50, according to an example embodiment of the present invention.

Referring to FIG. 27, at S101, the management system 50 generates a message indicating that image data is not received from the request terminal 10*aa* by the counterpart terminal 10*db*.

More specifically, at S101-1 of FIG. 28, the message generator 61 searches the terminal management DB 5003 using the IP address of the terminal 10*db*, which is received at S85, as a search key to obtain the terminal ID of the terminal 10*db*.

At S101-2, the message generator 61 searches the session management DB 5005 using the obtained terminal ID "01db" of the terminal 10*db* as a search key to obtain the terminal ID "01aa" of the terminal 10*aa*, which is communicating with the terminal 10*db* in the same session specified by the session ID "se1".

At S101-3, the message generator 61 searches the terminal management DB 5003 using the terminal ID "01aa" of the terminal 10*aa* as a search key to obtain the terminal name of the terminal 10*aa*. When extracting the terminal name, any portion of the terminal name may be extracted. For example, "Japan Tokyo Office AA Terminal", "Tokyo Office AA Terminal", or "AA Terminal" may be extracted from the terminal name.

At S101-4, the message generator 61 combines a message indicating that "IMAGE NOT RECEIVED" with the extracted terminal name "TERMINAL AA" to generate a message "IMAGE NOT RECEIVED FROM TERMINAL AA". In alternative to generating the message "IMAGE NOT RECEIVED", the message generator 61 may generate a message "ONLY SOUND IS RECEIVED" to indicate that only the sound data is received.

Referring back to FIG. 27, at S102, the data transmit/receive 51 of the management system 50 transmits the message, generated at S101, to the counterpart terminal 10*db* through the communication network 2.

At S103, the display control 17 of the terminal 10*db* causes the display 120*db* to display the message, which is received at the data transmit/receive 11 of the counterpart terminal 10*db*. For example, any one of screens illustrated in FIGS. 29 to 31 may be displayed to the user at the counterpart terminal 10*db*. In the following examples, it is assumed that a plurality of terminals including the terminal 10*aa* and the terminal 10*db* carry out videoconference.

Figure 29:
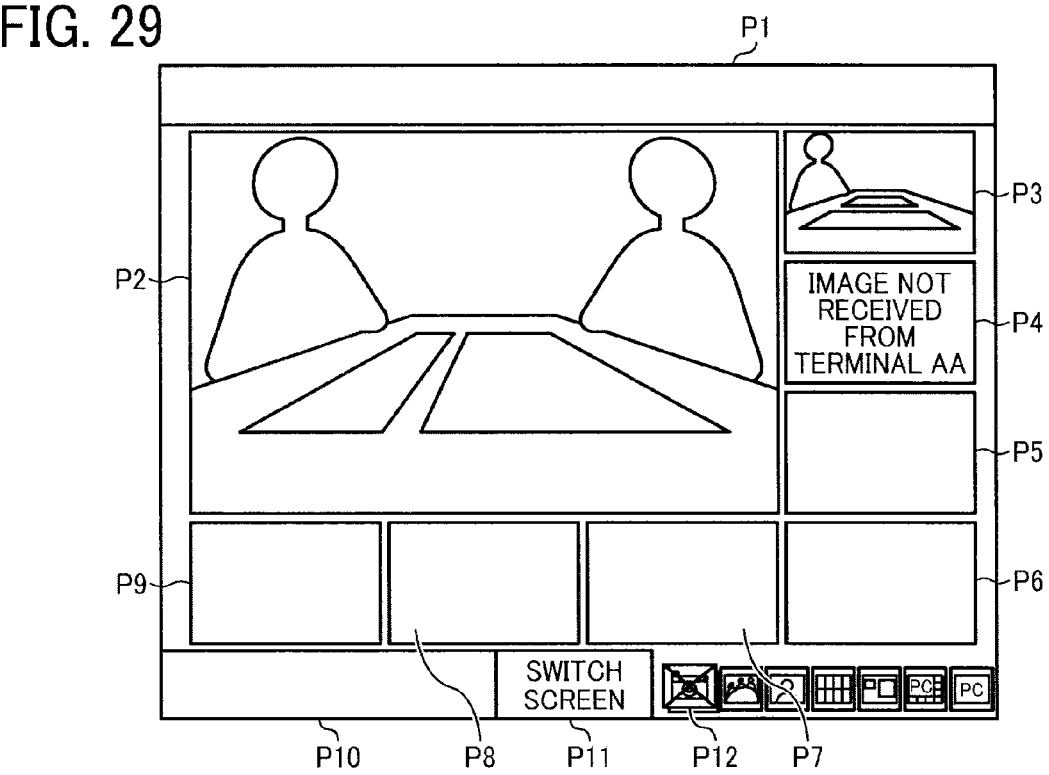
FIG. 29 is an illustration of an example screen displayed through a display, according to an example embodiment of the present invention.

The screen P1 of FIG. 29, which is displayed on the display 120*db*, includes a main screen P2 in which one or more users who are currently speaking at one of the terminals 10 are displayed, and a plurality of sub-screens P3 to P9 that are arranged at sides of the main screen P2. The sub-screen P3 displays one or more users at the terminal 10db. The sub-screen P4 displays one or more users at the terminal 10aa. The other sub-screen P5 to P9 may display one or more users at the other terminals 10. The screen P1 of FIG. 29 further includes a message display area P10, a "SWITCH SCREEN" button P11, and icons including a camera icon P12 at the lower portions of the screen P1. The message display area P10 displays therein a message. When selected such as by a pointer using the mouse, the "SWITCH SCREEN" button P11 switches an image displayed on the main screen P2 and one of the images displayed on the sub-screens P3 to P9. The camera icon P12 indicates whether the camera 112 of the terminal 10db is turned on such that image data is transmitted or turned off such that image data is not transmitted. When the camera icon P12 is shown with the mark "X", the camera 112 is turned on such that the user may turn off the camera 112 by selecting the camera icon P12. When the camera icon P12 is not shown with the mark "X", the camera 112 is turned off such that the user may turn on the camera 112 by selecting the camera icon P12.

The screen of FIG. 29 indicates that videoconference is carried out among three sites. Assuming that image data transmitted from the terminal 10aa to the terminal 10db, which is to be displayed on the sub-screen P4, is estimated to be delayed in about 600 ms based on the delay information, the image state changer 35 of the relay terminal 30a interrupts transmission of the image data to the terminal 10db. The terminal 10db is not able to receive the image data of one or more users at the terminal 10aa. In such case, the terminal 10db displays a message received at S102 onto the sub-screen P4, which indicates that image is not received from the terminal 10aa.

Figure 30:
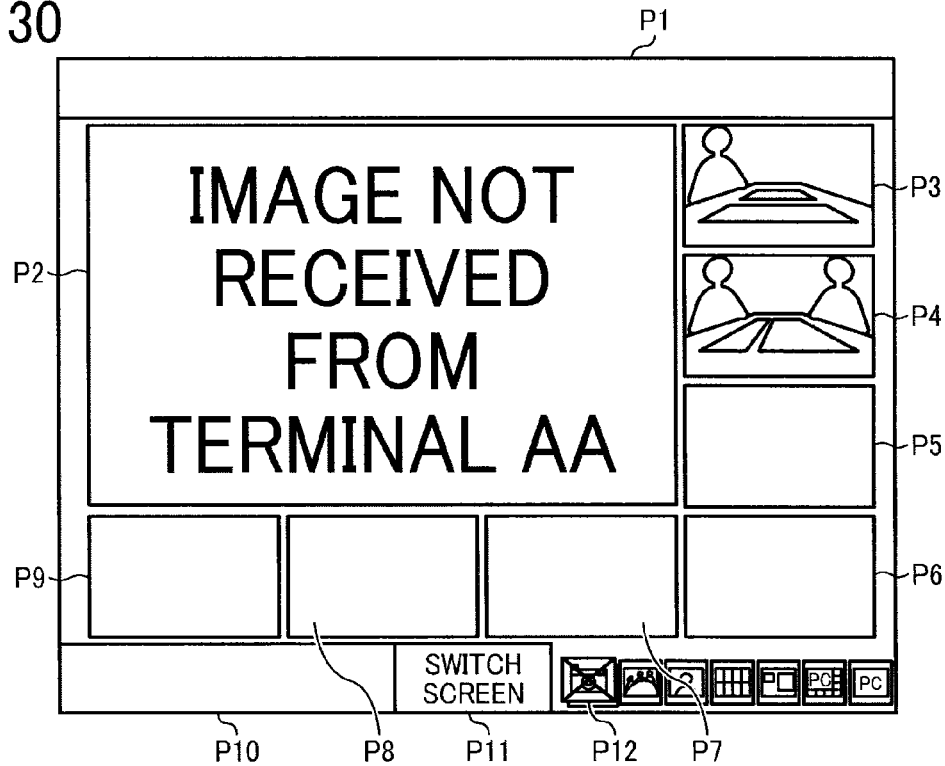
FIG. 30 is an illustration of an example screen displayed through a display, according to an example embodiment of the present invention.

The screen of FIG. 30 indicates that videoconference is carried out among three sites. Assuming that image data transmitted from the terminal 10aa, which is to be displayed on the main screen P2, is delayed in about 600 ms, the terminal 10db displays a message received from the management system 50 on the main screen P2, in alternative to displaying the image data that is expected to be received from the terminal 10aa.

Figure 31:
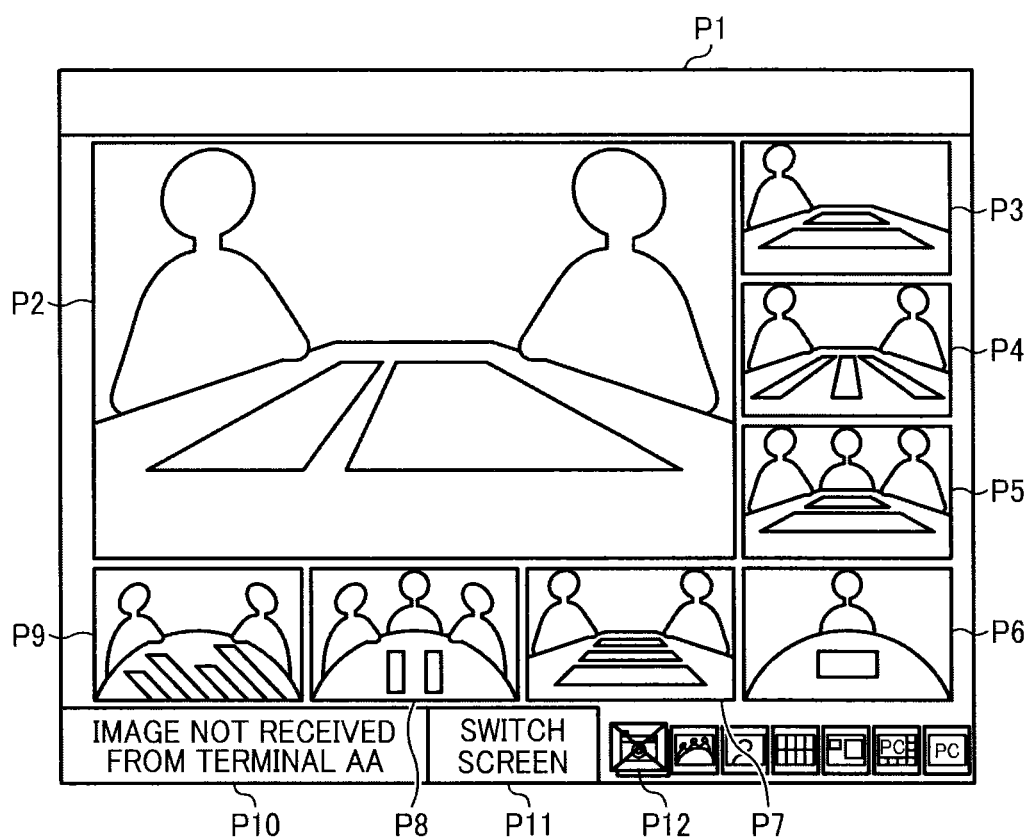
FIG. 31 is an illustration of an example screen displayed through a display, according to an example embodiment of the present invention.

The screen of FIG. 31 indicates that videoconference is carried out among more than eight sites. Assuming that image data transmitted from the terminal 10aa, which is to be displayed on the sub-screen P4, is delayed in about 600 ms, the terminal 10db displays image data of another terminal 10 that has been received at the relay terminal, on the sub-screen P4. The terminal 10db further displays a message in the message display area P10, indicating that image data is not received from the terminal 10aa.

The main screen P2 displays thereon image data of one of the terminals 10 that are participating in videoconference. For example, the display control 17 causes the display to display image data of the terminal 10 that is transmitting sound data, such as voices from the speaking user.

As described above, the management system 50 detects delay in reception of image data at the terminal 10 from the counterpart terminal 10, for example, when the relay terminal 30 interrupts relay of the image data. When the delay is detected, the management system 50 generates a message indicating that image data is not received from the counterpart terminal 10, and sends the message to the terminal 10. Alternatively, the message may indicate that only sound data is received from the counterpart terminal 10. The terminal 10, which receives the message, causes the display 120 to display the message. With this message, a user at the terminal 10 knows that videoconference is not interrupted, but image data is not received from the counterpart terminal 10 due to delay in data transmission. The user at the terminal 10 is able to continue videoconference, for example, by responding to the user at the counterpart terminal 10.

The management system 50 generates a message so as to include a name of the counterpart terminal 10 that transmits the image data. With information indicating the terminal name of the counterpart terminal 10, the user at the terminal 10 is able to know that, from which terminal the image data is not received, especially when videoconference takes place among three or more terminals 10.

The relay terminal 30, the management system 50, the program providing system 90, and the maintenance system 100 may be each implemented by a single computer. Alternatively, any number of parts, functions, or modules of the relay terminal 30, the management system 50, the program providing system 90, and the maintenance system 100 may be classified into a desired number of groups to be carried out by a plurality of computers. In case the program providing system 90 is implemented by the single computer, the program to be provided by the program providing system 90 may be transmitted, one module by one module, after dividing into a plurality of modules, or may be transmitted at once. In case the program providing system 90 is implemented as a plurality of computers, each computer may transmit each module that is stored in its memory, after the program is divided into a plurality of modules.

A recording medium storing any one of the terminal control program, relay control program, and transmission management program, or a storage device such as the HDD 204 that stores any one of the terminal control program, relay control program, and transmission management program, or the program providing system 90 provided with the HD 204 storing any one of the terminal control program, relay control program, and transmission management program, may be distributed within the country or to another country as a computer program product.

In the above-described examples, the quality of image data to be processed by the relay terminal 30, which is determined based on information obtainable from any one of the image state change management table of FIG. 10 and the image state management table of FIG. 18, is analyzed in terms of image resolution. Alternatively, any other criteria may be used to analyze quality of image data including, for example, depth of image, sampling frequency in case of sound data, and bit length in case of sound data. Further, the sound data may be transmitted or received in three items of sound data including high-resolution sound data, medium-resolution sound data, and low-resolution sound data.

Further, the date and time information stored in the relay terminal management table of FIG. 11 or the terminal management table of FIG. 13, or the delay information stored in the session management table of FIG. 15, is expressed in terms of date and time. Alternatively, the date and time information or the delay information may be expressed only in terms of time such as the time at which information is received.

Further, in the above-described examples, the relay terminal IP address of the relay terminal 30 and the terminal IP address of the terminal 10 are respectively managed using the relay terminal management table of FIG. 11 and the terminal management table of FIG. 13. Alternatively, the relay terminal 30 and the terminal 10 may each be managed using any other identification information or using any other tables. For example, when the relay terminal 30 or the terminal 10 needs to be identified on the communication network 2, the relay terminal 30 or the terminal 10 may be managed using Fully Qualified Domain Name (FQDN). In such case, the transmission system 10 is provided with a domain name system (DNS) server that obtains the IP address that corresponds to the FQDN of the relay terminal 30 or the terminal 10. In view of this, identification information for identifying the relay terminal 30 on the communication network 2 may not only include the identification information that identifies the relay terminal 30 on the communication network 2, but also identification information that identifies a node on the communication network 2 to which the relay terminal 30 is connected, or identification information that identifies a node on the communication network 2 from which the relay terminal 30 is connected. Similarly, identification information for identifying the terminal 10 on the communication network 2 may not only include the identification information that identifies the terminal 10 on the communication network 2, but also identification information that identifies a node on the communication network 2 to which the terminal 10 is connected, or identification information that identifies a node on the communication network 2 from which the terminal 10 is connected.

In the above-described examples, the transmission system 1 of FIG. 1 is treated as a videoconference system. Alternatively, the transmission system 1 of FIG. 1 may be implemented as a teleconference system such as the IP teleconference system or the Internet teleconference system. Alternatively, the transmission system 1 of FIG. 1 may be implemented as a car navigation system. For example, the request terminal 10 may be implemented as a car navigation system that is installed onto an automobile. The counterpart terminal 10 may be implemented as a management terminal or server at a management center that manages the car navigation system or a car navigation system that is installed onto another automobile.

In another example, the transmission system 1 of FIG. 1 may be implemented as a communication system having a portable phone. In such case, the terminal 10 is implemented as the portable phone. The terminal 10, or the portable phone 10, includes a body, a menu screen display button, a display section, a microphone provided at a lower portion of the body, and a speaker provided at an upper portion of the body. When selected, the menu screen display button causes the display section to display a menu screen in which various icons each indicating a specific application program are displayed. In this example, the display section displays a candidate terminal list that lists a plurality of terminal names together with a plurality of icons each reflecting the operation state of each candidate terminal. Since the terminal 10 in this example is implemented as a portable phone, the name of a user who owns the specific terminal, or a nickname of the user, is displayed as the terminal name. The display section is a touch panel screen, which allows the user to select one of the plurality of terminal names being displayed by the display section. When a specific terminal name, or a user name, is selected, the portable phone starts communication with the specific terminal that is selected in a substantially similar manner as described above.

In the above-described examples, the contents data is assumed to include image data and sound data. Alternatively, the contents data may include any other type of data that affects human senses of sight in alternative to image data, or any other type of data that affects human senses of hearing in alternative to sound data. Alternatively, the contents data may include any other type of data that affects human senses of sight, smell, taste, touch, and hearing. In case the contents data that affects human senses of touch, the terminal 10 may convey the contents data that reflects senses of touch that is felt by a user at the terminal 10 to another terminal 10 through the communication network 2. In case the contents data that affects human senses of smell, the terminal 10 may convey the contents data that affects senses of smell felt by a user at the terminal 10 to another terminal 10 through the communication network 2. In case the contents data that affects human senses of taste, the terminal 10 may convey the contents data that affects senses of taste felt by a user at the terminal 10 to another terminal 10 through the communication network 2.

Further, the contents data may only include one type of contents data selected from sight data such as image data, hearing data such as sound data, touch data, smell data, and taste data.

Further, in the above-described examples, the transmissions system 1 is implemented as a videoconference system for use at offices. Other examples of use of the transmission system 1 include, but not limited to, meetings, casual conversation among family members or friends, and distribution of information in one direction.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, any of the above-described devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cashe memory of the CPU, and the RAM may function as a physical memory or a primary memory of the apparatus, while the HDD may function as a secondary memory of the apparatus.

In one example, the present invention may reside in a transmission management system, which determines whether to change state of image data to be relayed by a relay terminal that relays image data and sound data at least between a first transmission terminal and a second transmission terminal. The transmission management system includes image state managing means, receiving means, message generating means, and transmitting means. The image state managing means manages delay information indicating delay in time at which image data is received at a transmission terminal, and image state information indicating a state of image data to be changed by the relay terminal in association with each other. The receiving means receives delay information indicating delay in time at which the image data is received at the second transmission terminal from the second transmission terminal. The message generating means searches the image state managing means using the received delay information to extract image state information that is associated with the received delay information, and generates a message when the extracted image state information indicates interruption of the image data. The message indicates that the image data is not received or only sound data is received. The transmitting means transmits the message to the second transmission terminal.

For example, the image state managing means corresponds to the image state management DB 5007. The receiving means and the transmitting means correspond to the data transmit/receive 51. The message generating means corresponds to the message generator 61.

As described above, when the transmission management system determines that relay of the image data to the second transmission terminal is interrupted by the relay terminal due to a delay in data transmission, the transmission management system generates a message indicating that image data is not received or only sound data is received, and sends such message to the second transmission terminal for display to the user at the second transmission terminal. With this message, the user at the second transmission terminal is able to know that transmission of the image data from the first transmission terminal is interrupted due to the delay in transmission of image data. Accordingly, the user at the second transmission terminal is expected to feel more comfortable in continue talking with the user at the first transmission terminal.

In another example, the transmission management system further includes: terminal managing means for managing, for each one of a plurality of transmission terminals, identification information, address information indicating an address of the terminal, and terminal name information indicating a name of the terminal, in association with one another; and session managing means for managing, for each session, first identification information for identifying the first transmission terminal and second identification information for identifying the second transmission terminal in association with each other.

For example, the terminal management means corresponds to the terminal management DB 5003, and the session management means corresponds to the session management DB 5005.

The receiving means receives address information indicating an address of the second transmission terminal that transmits the delay information, together with the delay information. The message generating means searches the terminal managing means using the received address information to extract the second identification information, and further searches the session managing means using the extracted second identification information to extract the first identification information that is associated with the second identification information for the same session. The message generating means further searches the terminal managing means using the extracted first identification information to extract the terminal name information of the first transmission terminal, and includes at least a part of a terminal name specified by the extracted terminal name information in the message.

In one example, the present invention may reside in a transmission management method managed by a transmission management system, which determines whether to change state of image data to be relayed by a relay terminal that relays image data and sound data between a first transmission terminal and a second transmission terminal. The transmission management system includes image state managing means, which manages delay information indicating delay in time at which image data is received at a transmission terminal, and image state information indicating a state of image data to be changed by the relay terminal in association with each other. The transmission management method includes: receiving delay information indicating delay in time at which the image data is received at the second transmission terminal from the second transmission terminal; searching the image state managing means using the received delay information to extract image state information that is associated with the received delay information; generating a message when the extracted image state information indicates interruption of the image data, the message indicating that the image data is not received or only sound data is received; and transmitting the message generated by the generating step to the second transmission terminal.

The transmission management system further includes: terminal managing means for managing, for each one of a plurality of transmission terminals, identification information, address information indicating an address of the terminal, and terminal name information indicating a name of the terminal, in association with one another; and session managing means for managing, for each session, first identification information for identifying the first transmission terminal and second identification information for identifying the second transmission terminal in association with each other. The receiving step includes: receiving address information indicating an address of the second transmission terminal that transmits the delay information, together with the delay information. The message generating step includes: searching the terminal managing means using the received address information to extract the second identification information; searching the session managing means using the extracted second identification information to extract the first identification information that is associated with the second identification information for the same session; searching the terminal managing means using the extracted first identification information to extract the terminal name information of the first transmission terminal; and including at least a part of a terminal name specified by the extracted terminal name information in the message.

In another example, the present invention may reside in a plurality of instructions which, when executed, cause a processor to perform any one of the above-described methods.

In another example, the present invention may reside in a program providing system, which provides the plurality of instructions to the transmission management system through the communication network.

In another example, the present invention may reside in a maintenance system, which maintains the transmission management system.

For example, the present invention may reside in a non-transitory recording medium which, when executed by a processor, cause the processor to perform a method of managing transmission of image data and sound data between a first transmission terminal and a second transmission terminal via a relay terminal. The method including: receiving delay information indicating delay in time at which the image data is received at the second transmission terminal through the relay terminal, from the second transmission terminal; and determining whether the relay terminal interrupts relaying of the image data received from the first transmission terminal to the second transmission terminal based on image state information that is associated with the receive delay information to generate a determination result, the image state information indicating whether the relay terminal should interrupt transmission of the image data to the second transmission terminal when a delay time specified by the received delay information is obtained. When the determination result indicates that the relay terminal interrupts relaying of the image data, the method further includes: generating a message indicating that the image data is not received or only sound data is received; and transmitting the message to the second transmission terminal through the network interface for display at the second transmission terminal.

What is claimed is:

1. A transmission management apparatus that manages transmission of image data and sound data between a first transmission terminal and a second transmission terminal via a relay device, the transmission management apparatus, which is external to the first transmission terminal and the second transmission terminal, comprising:
a network interface to receive delay information indicating delay in time at which the image data sent from the first transmission terminal is received at the second transmission terminal through the relay device, from the second transmission terminal; and
processing circuitry to determine whether the relay device interrupts relaying of the image data received from the first transmission terminal to the second transmission terminal based on image state information that is associated with the received delay information to generate a determination result, the image state information indicating whether the relay device interrupts transmission of the image data to the second transmission terminal when a delay time specified by the received delay information is obtained, wherein
when the determination result indicates that the relay device interrupts relaying of the image data, the processing circuitry generates a message indicating that the image data is not received or only sound data is received, and controls transmission of the message to the second transmission terminal through the network interface for display at the second transmission terminal.

2. The transmission management apparatus of claim 1, further comprising:
a memory to store, for each one of a plurality of values of delay information indicating delay in time at which the image data is expected to be received at a transmission terminal, image state information indicating whether the relay device interrupts transmission of the image data to the transmission terminal when a delay time specified by the delay information is obtained, wherein
the processing circuitry extracts the image state information stored in association with a value of the received delay information, as the image state information to be used for determining whether the relay device interrupts relaying of the image data.

3. The transmission management apparatus of claim 2, wherein the memory is further configured to store:
terminal management information that manages, for each one of a plurality of transmission terminals, identification information that identifies a transmission terminal, address information indicating an address of the transmission terminal, and terminal name information indicating a name of the transmission terminal, in association with one another; and
session management information that manages first identification information that identifies the first transmission terminal and second identification information that identifies the second transmission terminal, in association with session identification information that identifies a session established between the first transmission terminal and the second transmission terminal.

4. The transmission management apparatus of claim 3, wherein
the network interface further receives address information indicating an address of the second transmission terminal that transmits the delay information, and
the processing circuitry is further configured to:
search the terminal management information using the received address information to extract the second identification information of the second transmission terminal;
search the session management information using the extracted second identification information to extract the first identification information that is associated with the second identification information;
search the terminal management information using the extracted first identification information to extract the terminal name information of the first transmission terminal; and
include at least a part of a terminal name specified by the extracted terminal name information in the message.

5. A transmission system, comprising:
a first transmission terminal;
a second transmission terminal to receive image data and sound data from the first transmission terminal via a relay device, and to periodically detect a delay time indicating a time period required for the second transmission terminal to receive image data transmitted from the first transmission terminal through the relay device, to obtain delay information; and
a transmission management apparatus which is external to the first transmission terminal and the second transmission terminal, including:
a network interface to receive the delay information from the second transmission terminal; and processing circuitry to determine whether the relay device interrupts relaying of the image data received from the first transmission terminal to the second transmission terminal based on image state information that is associated with the received delay information to generate a determination result, the image state information indicating whether the relay device interrupts transmission of the image data to the second transmission terminal when a delay time specified by the received delay information is obtained, wherein when the determination result indicates that the relay device interrupts relaying of the image data, the processor generates a message indicating that the image data is not received or only sound data is received, and transmits the message to the second transmission terminal through the network interface for display at the second transmission terminal.

6. The transmission system of claim 5, further comprising:

a memory to store, for each one of a plurality of values of delay information indicating delay in time at which the image data is expected to be received at a transmission terminal, image state information indicating whether the relay device interrupts transmission of the image data to the transmission terminal when a delay time specified by the delay information is obtained, wherein the processing circuitry of the transmission management apparatus extracts the image state information stored in association with a value of the received delay information, as the image state information to be used for determining whether the relay device interrupts relaying of the image data.

7. The transmission system of claim 6, further comprising:

a memory to store terminal management information that manages, for each one of a plurality of transmission terminals, identification information that identifies a transmission terminal, address information indicating an address of the transmission terminal, and terminal name information indicating a name of the transmission terminal, in association with one another; and a memory to store session management information that manages first identification information that identifies the first transmission terminal and second identification information that identifies the second transmission terminal, in association with session identification information that identifies a session established between the first transmission terminal and the second transmission terminal.

8. The transmission system of claim 7, wherein the network interface of the transmission management apparatus further receives address information indicating an address of the second transmission terminal that transmits the delay information, and the processing circuitry of the transmission management apparatus is further configured to:

search the terminal management information using the received address information to extract the second identification information of the second transmission terminal;

search the session management information using the extracted second identification information to extract the first identification information that is associated with the second identification information;

search the terminal management information using the extracted first identification information to extract the terminal name information of the first transmission terminal; and include at least a part of a terminal name specified by the extracted terminal name information in the message.

9. A method, implemented by a transmission management apparatus, of managing transmission of image data and sound data between a first transmission terminal and a second transmission terminal via a relay device, the transmission management apparatus being external to the first transmission terminal and the second transmission terminal, the method comprising:

receiving delay information indicating delay in time at which the image data sent from the first transmission terminal is received at the second transmission terminal through the relay device, from the second transmission terminal; and determining, by processing circuitry of the transmission management apparatus, whether the relay device interrupts relaying of the image data received from the first transmission terminal to the second transmission terminal based on image state information that is associated with the receive delay information to generate a determination result, the image state information indicating whether the relay device interrupts transmission of the image data to the second transmission terminal when a delay time specified by the received delay information is obtained, wherein when the determination result indicates that the relay device interrupts relaying of the image data, the method further includes:

generating a message indicating that the image data is not received or only sound data is received; and transmitting the message to the second transmission terminal through a network for display at the second transmission terminal.

10. The method of claim 9, further comprising:

storing in a memory, for each one of a plurality of values of delay information indicating delay in time at which the image data is expected to be received at a transmission terminal, image state information indicating whether the relay device interrupts transmission of the image data to the transmission terminal when a delay time specified by the delay information is obtained; and extracting the image state information stored in association with a value of the received delay information, as the image state information to be used for determining whether the relay device interrupts relaying of the image data.

11. The method of claim 10, further comprising:

storing, in the memory, terminal management information that manages, for each one of a plurality of transmission terminals, identification information that identifies a transmission terminal, address information indicating an address of the transmission terminal, and terminal name information indicating a name of the transmission terminal, in association with one another; and storing, in the memory, session management information that manages first identification information that identifies the first transmission terminal and second identification information that identifies the second transmission terminal, in association with session identification information that identifies a session established between the first transmission terminal and the second transmission terminal.

12. The method of claim 11, further comprising:

receiving address information indicating an address of the second transmission terminal that transmits the delay information;

searching the terminal management information using the received address information to extract the second identification information of the second transmission terminal;

searching the session management information using the extracted second identification information to extract the first identification information that is associated with the second identification information;

searching the terminal management information using the extracted first identification information to extract the terminal name information of the first transmission terminal; and including at least a part of a terminal name specified by the extracted terminal name information in the message.

* * * * *